(12) United States Patent
Kim et al.

(10) Patent No.: US 11,796,861 B2
(45) Date of Patent: Oct. 24, 2023

(54) DISPLAY DEVICE

(71) Applicant: LG ELECTRONICS INC., Seoul (KR)

(72) Inventors: Seungse Kim, Seoul (KR); Juyoung Joung, Seoul (KR); Minho Kim, Seoul (KR); Woongjoon Hwang, Seoul (KR); Dukil Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/855,191

(22) Filed: Jun. 30, 2022

(65) Prior Publication Data

US 2023/0004047 A1 Jan. 5, 2023

(30) Foreign Application Priority Data

Jun. 30, 2021 (KR) .................. 10-2021-0085621

(51) Int. Cl.
*G02F 1/13357* (2006.01)
*G02F 1/1335* (2006.01)
(Continued)

(52) U.S. Cl.
CPC ........ *G02F 1/133608* (2013.01); *F21V 5/007* (2013.01); *G02F 1/133314* (2021.01);
(Continued)

(58) Field of Classification Search
CPC .......... F21V 7/008; F21V 5/007; F21V 5/004; G02F 1/133603; G02F 1/133602;
(Continued)

(56) References Cited

U.S. PATENT DOCUMENTS

2012/0081630 A1* 4/2012 Yokota ............. G02F 1/133608
362/249.02
2012/0099295 A1* 4/2012 Yokota ............. G02F 1/133603
362/97.1
(Continued)

FOREIGN PATENT DOCUMENTS

CN 110032000 A * 7/2019
JP 2008294309 12/2008
(Continued)

OTHER PUBLICATIONS

Korean Intellectual Property Office Application Serial No. 10-2021-0085621, Office Action dated Nov. 7, 2022, 5 pages.
(Continued)

*Primary Examiner* — Erin Kryukova
(74) *Attorney, Agent, or Firm* — LEE, HONG, DEGERMAN, KANG & WAIMEY PC

(57) ABSTRACT

Disclosed is a display device. The display device of the present disclosure may include: a display panel; a frame located at a rear side of the display panel; a substrate located between the display panel and the frame, wherein the substrate is coupled to the frame and extends in a longitudinal direction; a plurality of light sources mounted on the substrate, wherein each of the plurality of light sources are spaced apart from each other in the longitudinal direction of the substrate; a plurality of lenses coupled to the substrate, wherein the plurality of lenses cover the plurality of light sources; and a bar coupled to the substrate, wherein the bar connects each of the plurality of lenses.

13 Claims, 25 Drawing Sheets

(51) Int. Cl.
  *G02F 1/1333* (2006.01)
  *F21V 5/00* (2018.01)
(52) U.S. Cl.
  CPC .. *G02F 1/133603* (2013.01); *G02F 1/133605* (2013.01); *G02F 1/133607* (2021.01)
(58) Field of Classification Search
  CPC ......... G02F 1/133606; G02F 1/133607; G02F 1/133611; G02F 1/133526; G02F 1/133608; G02F 1/133605; G02B 3/005; G02B 3/0056
  See application file for complete search history.

(56) References Cited

U.S. PATENT DOCUMENTS

| | | | | |
|---|---|---|---|---|
| 2014/0036479 | A1* | 2/2014 | Kim | G02F 1/133611 362/97.2 |
| 2014/0354914 | A1* | 12/2014 | Lee | G02F 1/133608 362/97.3 |
| 2015/0042897 | A1 | 2/2015 | Namekata | |
| 2016/0215955 | A1* | 7/2016 | Donato | G02B 3/0056 |
| 2016/0363817 | A1* | 12/2016 | Park | G02F 1/133611 |
| 2017/0200421 | A1* | 7/2017 | Baek | G02F 1/133608 |
| 2020/0370713 | A1* | 11/2020 | Raleigh | F21V 31/005 |
| 2021/0191197 | A1* | 6/2021 | Park | G02F 1/133608 |

FOREIGN PATENT DOCUMENTS

| | | | | |
|---|---|---|---|---|
| KR | 20110124882 A | * | 11/2011 | |
| KR | 20120035365 | | 4/2012 | |
| KR | 20120035365 A | * | 4/2012 | |
| KR | 20150038787 A | * | 4/2015 | |
| KR | 20160131549 | | 11/2016 | |
| KR | 20190053312 | | 5/2019 | |
| WO | WO-2012032978 A1 | * | 3/2012 | ......... G02B 27/0927 |

OTHER PUBLICATIONS

European Patent Office Application Serial No. 22181000.5, Search Report dated Nov. 28, 2022, 8 pages.

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2021-0085621, filed on Jun. 30, 2021, the contents of which are all hereby incorporated by reference herein in their entirety.

BACKGROUND OF THE INVENTION

1. Field of the Invention

The present disclosure relates to a display device

2. Description of the Related Art

Due to technological advances, the demand for display devices in various forms is rapidly increasing. For example, in recent years, various display devices such as Liquid Crystal Display Device (LCD), Organic Light Emitting Diode (OLED), and Micro LED have been researched and used.

Among them, the liquid crystal panel of the LCD includes a liquid crystal layer, a thin film transistor (TFT) substrate and a color filter substrate facing each other with the liquid crystal layer interposed therebetween for displaying an image using light provided from a backlight unit.

In addition, there has been an increase in research on a substrate on which a light source such as a Light Emitting Diode (LED) is mounted and a coupling structure between the substrate and a reflective sheet.

SUMMARY OF THE INVENTION

An object of the present disclosure is to solve the problems described above and other problems. Another object of the present disclosure is to provide a display device capable of reducing manufacturing cost or process cost of a substrate.

Another object of the present disclosure is to provide a display device capable of securing enough light in a wide range in relation to a number and position of light sources.

Another object of the present disclosure is to provide a display device capable of improving the productivity of lenses fixed on a substrate.

Another object of the present disclosure is to provide a display device capable of improving the adhesion of the lens and the reflective sheet with respect to the substrate.

Another object of the present disclosure is to provide various examples of the shape of a bar connecting a plurality of lenses.

In accordance with an aspect of the present disclosure, a display device may include: a display panel; a frame located at a rear side of the display panel; a substrate located between the display panel and the frame, wherein the substrate is coupled to the frame and extends in a longitudinal direction; a plurality of light sources mounted on the substrate, wherein each of the plurality of light sources are spaced apart from each other in the longitudinal direction of the substrate; a plurality of lenses coupled to the substrate, wherein the plurality of lenses cover the plurality of light sources; and a bar coupled to the substrate, wherein the bar connects each of the plurality of lenses.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
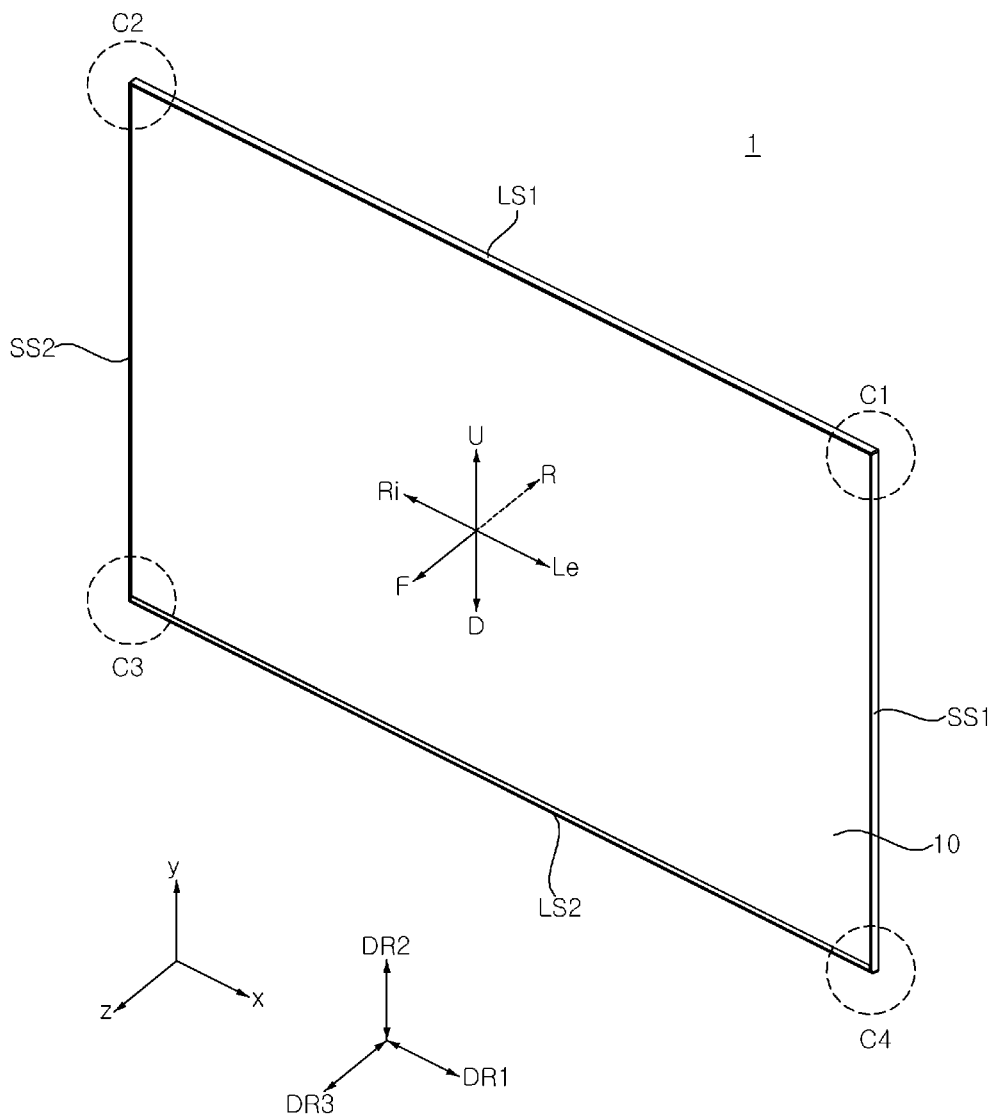
FIGS. 1 to 25 are diagrams illustrating examples of a display device according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings.

In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the following description, even if the embodiments are described with reference to specific figures, if necessary, reference numbers not appearing in the specific figures may be referred to, and reference numbers not appearing in the specific figures are used in a case where the above reference numbers appear in the other figures.

Referring to FIG. 1, a display device 1 may include a display panel 10. The display panel 10 may display a screen.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1 and LS2 are longer than the lengths of the first and second short sides SS1 and SS2, but it may be possible that the lengths of the first and second long sides LS1 and LS2 are approximately equal to or shorter than the lengths of the first and second short sides SS1 and SS2.

A direction parallel to the long sides LS1 and LS2 of the display device 1 may be referred to as a left-right direction or a first direction DR1. A direction parallel to the short sides SS1 and SS2 of the display device 1 may be referred to as a vertical direction or a second direction DR2. A direction orthogonal to the long sides LS1 and LS2 and the short sides SS1 and SS2 of the display device 1 may be referred to as a front-rear direction or a third direction DR3.

A direction in which the display panel 10 displays an image may be referred to as a front (F, z), and a direction opposite to the front may be referred to as a rear (R). The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
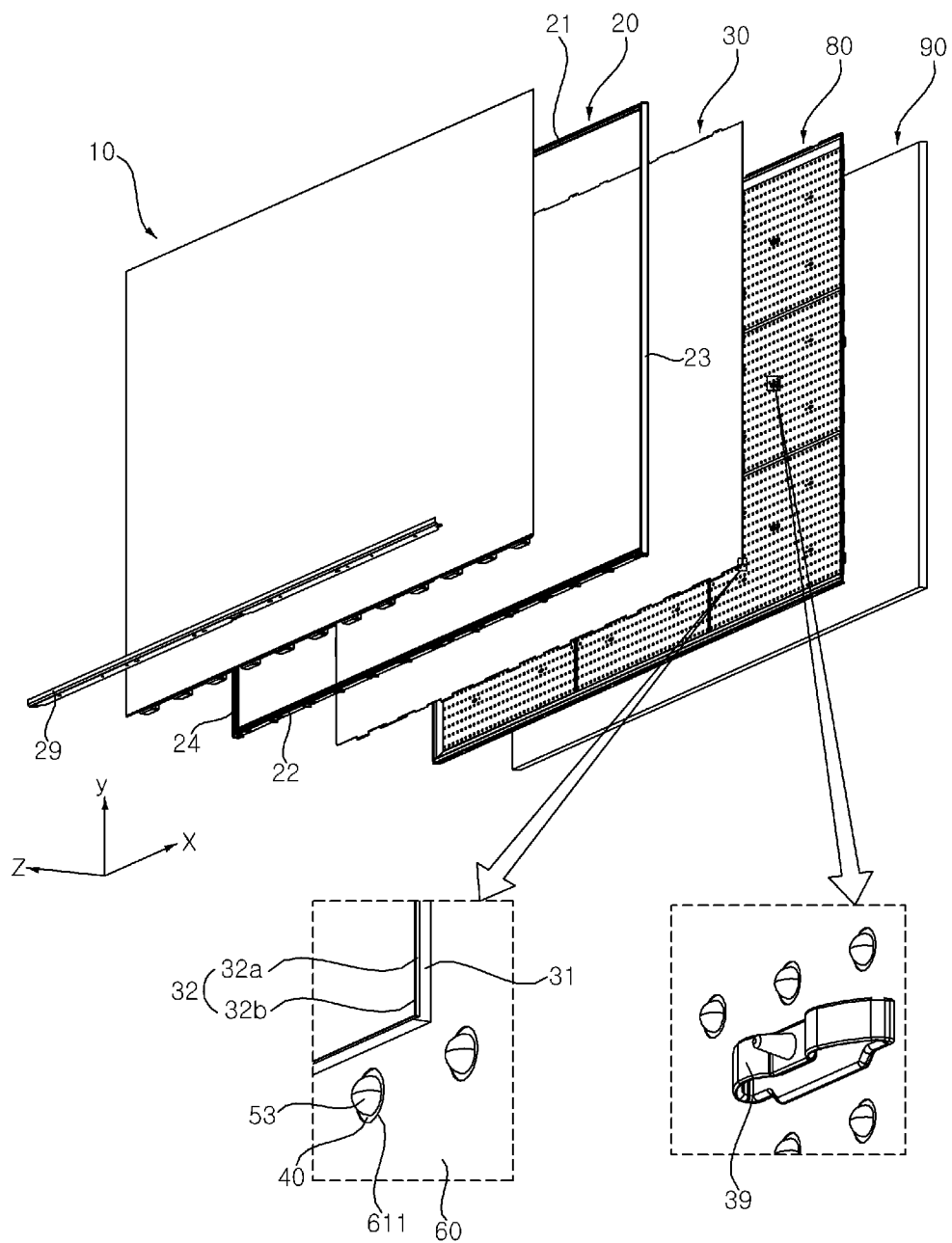

Referring to FIG. 2, the display device may include a display panel 10, a side frame 20, a backlight unit, a frame 80, and a back cover 90.

The display panel 10 may form the front side of the display device 1 and may display an image. The display panel 10 may display an image in such a manner that a plurality of pixels output red, green or blue (RGB) for each pixel in time. The display panel 10 may be divided into an active area in which an image is displayed and a de-active area in which an image is not displayed. The display panel 10 may include a front substrate and a rear substrate facing each other with a liquid crystal layer interposed therebetween. The display panel 10 may also be referred to as an LCD panel.

The front substrate may include a plurality of pixels including red, green, and blue sub-pixels. The front substrate may output light corresponding to a color of red, green, or blue according to a control signal.

The rear substrate may include switching elements. The rear substrate may switch a pixel electrode. For example, the pixel electrode may change the molecular arrangement of the liquid crystal layer according to a control signal applied externally. The liquid crystal layer may include liquid crystal molecules. The arrangement of the liquid crystal molecules may be changed according to a voltage difference generated between a pixel electrode and a common electrode. The liquid crystal layer may transmit, or block light provided from the backlight unit to the front substrate.

The side frame 20 may extend along the circumference of the display panel 10. The side frame 20 may cover a side surface of the display panel 10. The side frame 20 may be coupled to the display panel and may support the display panel 10. Meanwhile, the side frame 20 may also be referred to as a guide panel.

The backlight unit may be located in the rear side of the display panel 10. The backlight unit may be coupled to the frame 80 at the front of the frame 80. The backlight unit may be driven by a full driving method or a partial driving method such as local dimming or impulsive. The backlight unit may include light sources providing light, a substrate 40 on which the light sources are mounted, lenses 53 covering the light sources, a reflective sheet 60 covering the entire surface of the substrate 40, and an optical unit 30 located in a front side of the reflective sheet 60.

The optical unit 30 may face the display panel 10 with respect to the side frame 20. The optical unit 30 may evenly transmit the light of the light source to the display panel 10. The optical unit 30 may include a diffuser plate 31 and an optical sheet 32.

The diffuser plate 31 may be located between the reflective sheet 60 and the optical sheet 32. The diffuser plate 31 may diffuse the light from the light source. In addition, an air gap may be formed between the reflective sheet 60 and the diffuser plate 31. The air gap may serve as a buffer such that the light from the light source may be widely spread by the air gap. A supporter 39 may be located between the reflective sheet 60 and the diffuser plate 31 such that one side may be coupled to the reflective sheet 60 and the other side may support the diffuser plate 31. In other words, the supporter 39 may form the air gap. For example, the distance between the light source and the optical sheet 32 may be 10 mm or less.

The optical sheet 32 may be adjacent to or in contact with the front side of the diffuser plate 31. The optical sheet 32 may include at least one sheet. For example, the optical sheet 32 may include a plurality of sheets having different functions, and the plurality of sheets may be bonded or adhered to each other. For example, the first optical sheet 32a may be a diffusion sheet, and the second optical sheet 32b may be a prism sheet. The diffusion sheet may prevent light emitted from the diffuser plate 31 from being partially concentrated, thereby making light distribution uniform. The prism sheet may collect light emitted from the diffusion sheet and provide the collected light to the display panel 10. In this case, the number and/or position of the diffusion sheet and the prism sheet may be changed.

For example, the optical sheet 32 may change the wavelength or color of light provided from the light source. As another example, the optical sheet 32 may include a red-based phosphor and/or a green-based phosphor. In this case, the light source may provide blue-based light, and the optical sheet 32 may convert the light from the light source into white light. Meanwhile, the optical sheet 32 may be referred to as a Quantum Dot (QD) Sheet.

The frame 80 may be located at the rear side of the backlight unit. The display panel 10, the side frame 20, and the backlight unit may be coupled to the frame 80. The frame 80 may support the components of the display device described above and below. For example, the frame 80 may include a metal material such as an aluminum alloy. Meanwhile, the frame 80 may be referred to as a main frame or a module cover.

The back cover 90 may cover the rear side of the frame 80, and may be coupled to the frame 80. For example, the back cover 90 may be an injection molded product made of a resin material. As another example, the back cover 90 may include a metal material.

Figure 3:
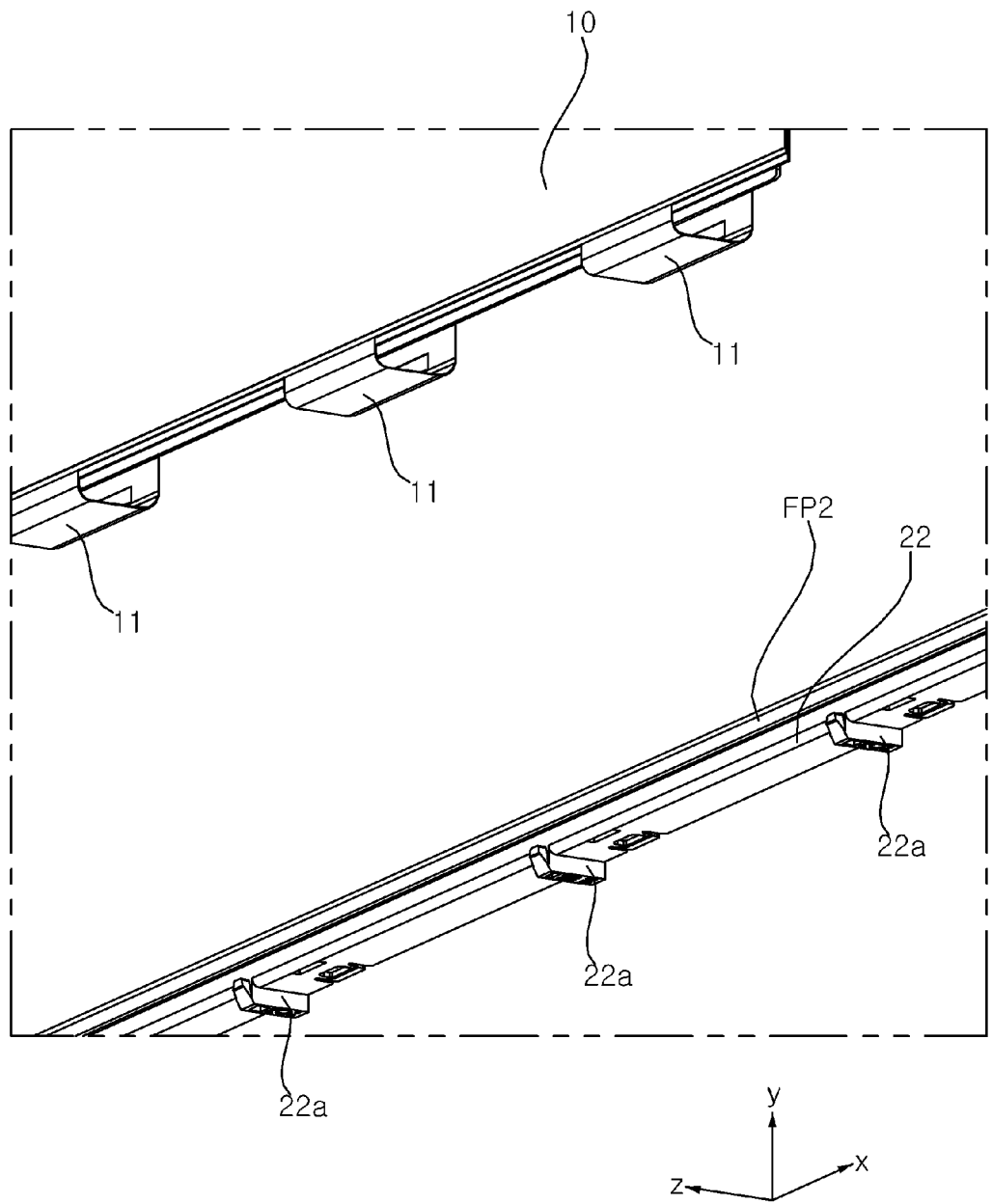
Figure 4:
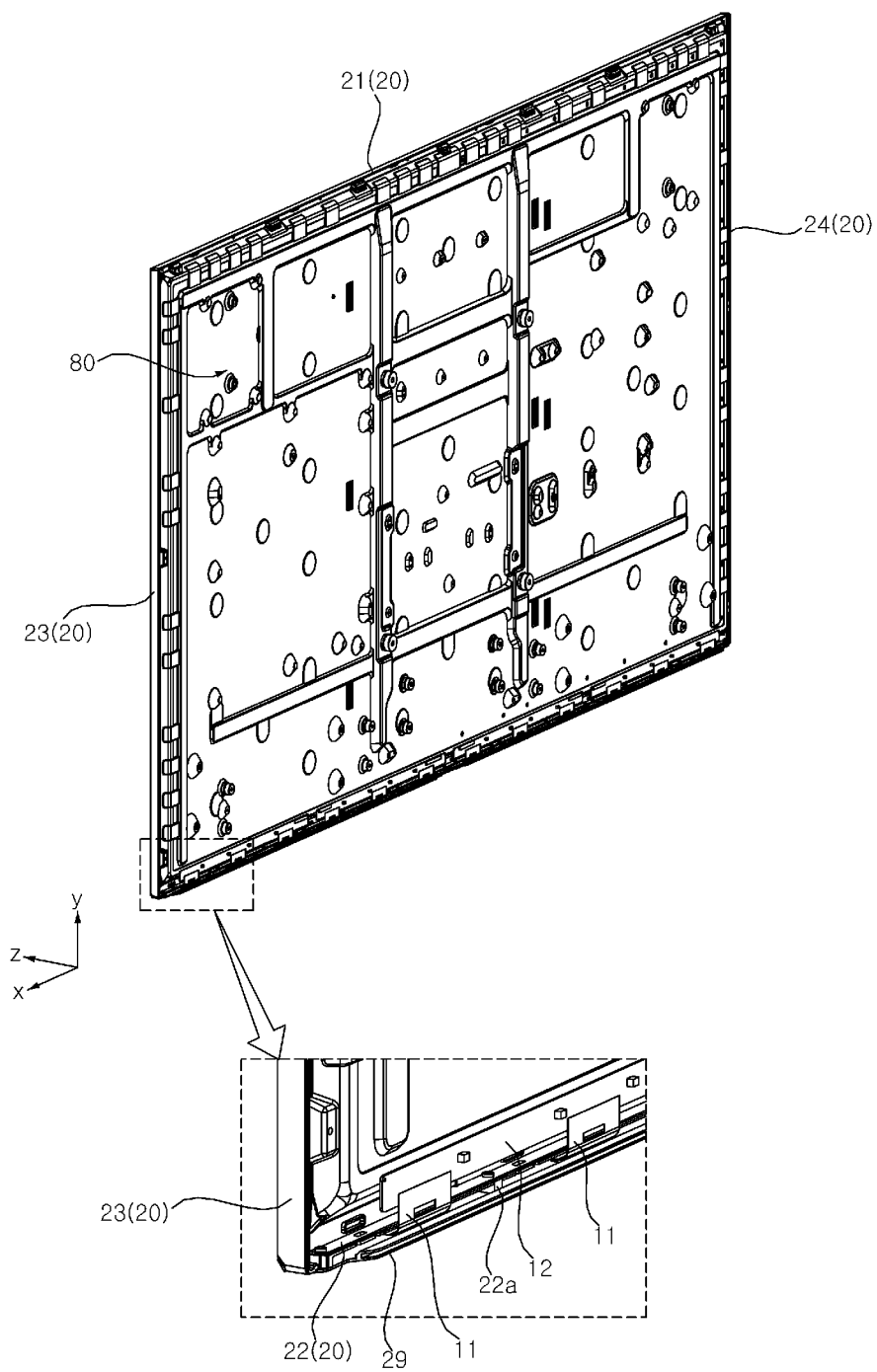

Referring to FIGS. 3 and 4, the side frame 20 may include a first part 21(20), a second part 22(20), a third part 23(20), and a fourth part 24(20). The first part 21(20) may extend along an upper side of the display panel 10 and form a first long side LS1 (see FIG. 1). The second part 22(20) may extend along a lower side of the display panel 10. The third part 23(20) may extend along the left side of the display panel 10 and may form the first short side SS1 (see FIG. 1).

The fourth part 24 (20) may extend along the right side of the display panel 10 and may form a second short side SS2 (see FIG. 1).

A bottom cover 29 may extend along the second part 22(20) and may be coupled to the second part 22(20) at the lower side of the second part 22(20). The bottom cover 29 may cover the lower side of the second part 22 and may form a second long side LS2 (see FIG. 1). A plurality of protrusions 22a may protrude from the lower side of the second part 22(20) toward the bottom cover 29 and may be spaced apart from each other in the length direction of the second part 22(20).

One end of the cable 11 may be connected to the lower side of the display panel 10, and the other end of the cable 11 may be located in the rear of the frame 80. A source printed circuit board (S-PCB) 12 may be located at the rear side of the frame 80 adjacent to the lower side of the frame 80, and may be connected to the other end of the cable 11. A portion between one end of the cable and the other end of the cable 11 may be disposed between the second part 22(20) and the bottom cover 29. The cables 11 may be disposed between the protrusions 22a. As an example, the cable 11 may be a flexible flat cable (FFC).

Figure 5:
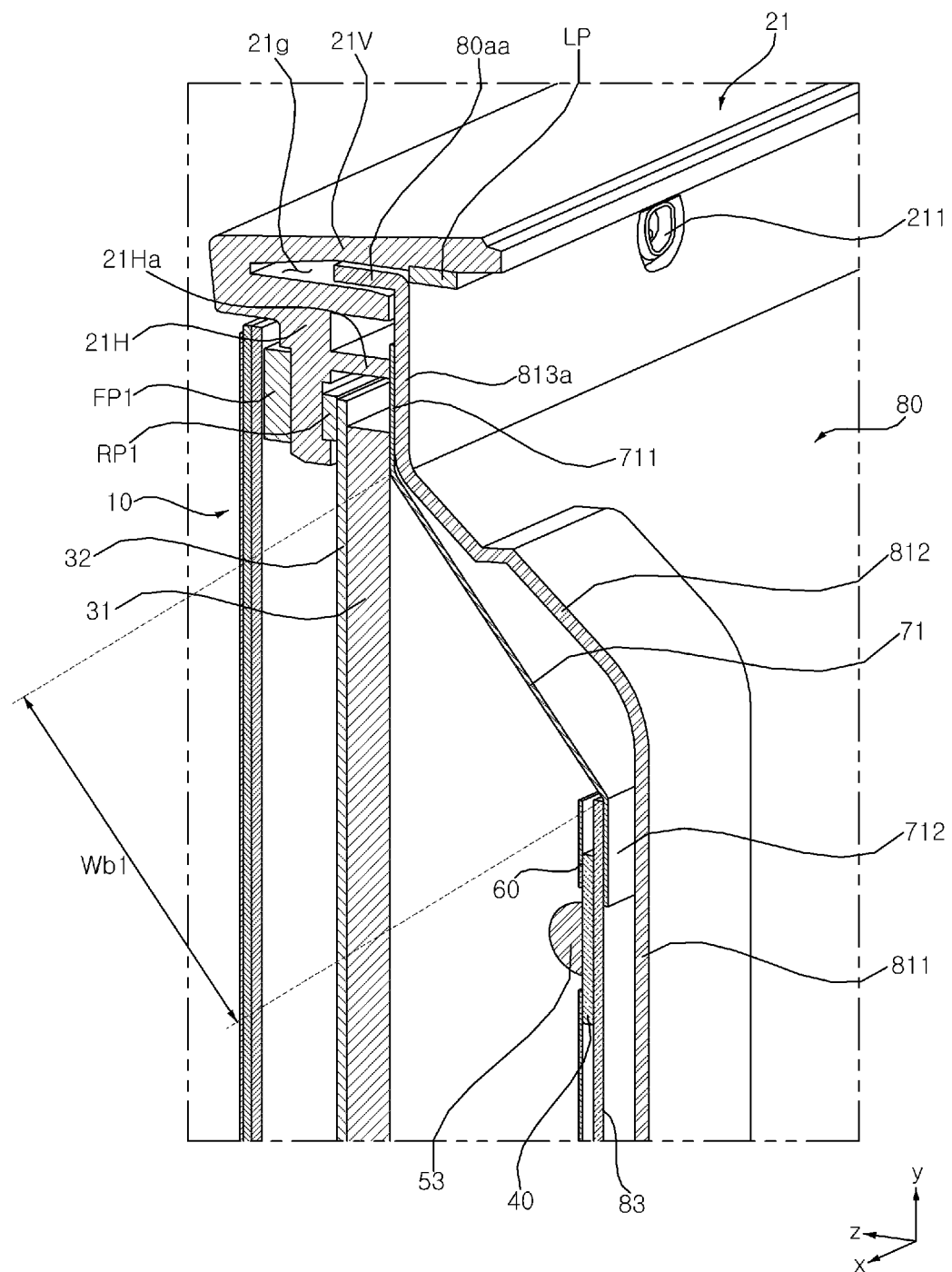

Referring to FIGS. 5, the first part 21 may cover the upper sides of the display panel 10 and the frame 80. The first part 21 may include a first vertical portion 21V and a first horizontal portion 21H. The first vertical portion 21V and the first horizontal portion 21H may extend in the left-right direction.

The first vertical portion 21V may form an upper side of the first part 21 and may form a first long side LS1 (see FIG. 1). The first vertical portion 21V may have a width in an intersecting direction with the display panel 10. In other words, the length of the first vertical portion 21V may be defined in the left-right direction, the width of the first vertical portion 21V may be defined in the front-rear direction, and the thickness of the first vertical portion 21V may be defined in the vertical direction. Meanwhile, a first groove 21g may be formed from the rear side of the first vertical portion 21V toward the inside of the first vertical portion 21V, and may be inserted to an upper end 80aa of the frame 80.

The first horizontal portion 21H may protrude into and between the display panel 10 and the optical sheet 32 from the lower side of the first vertical portion 21V. The first horizontal portion 21H may be disposed in parallel to the display panel 10 at the rear side of the display panel 10. In other words, the length of the first horizontal portion 21H may be defined in the left-right direction, the width of the first horizontal portion 21H may be defined in the vertical direction, and the thickness of the first horizontal portion 21H may be defined in the front-rear direction. Meanwhile, a first front pad FP1 may be located between the display panel 10 and the first horizontal portion 21H, and may be coupled to the front side of the first horizontal portion 21H. In addition, a first rear pad RP1 may be located between the display panel 10 and the optical sheet 32, and may be coupled to the rear side of the first horizontal portion 21H.

Figure 6:
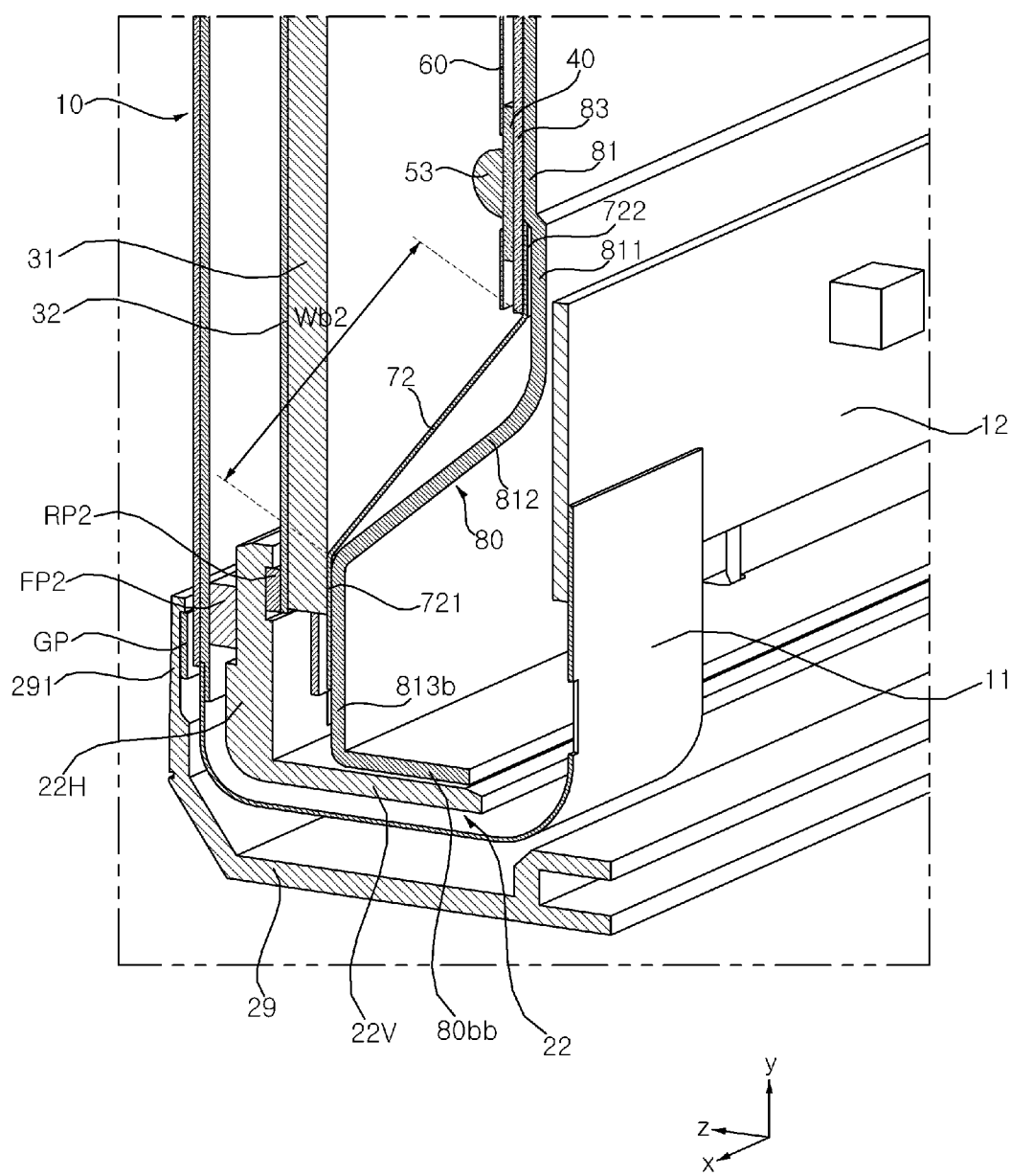

Referring to FIG. 6, the second part 22 may cover the lower side of the frame 80. The second part 22 may include a second vertical portion 22V and a second horizontal portion 22H. The second vertical portion 22V and the second horizontal portion 22H may extend longitudinally in the left-right direction.

The second vertical portion 22V may form a lower side of the second part 22. The second vertical portion 22V may have a width in an intersecting direction with the display panel 10. In other words, the length of the second vertical portion 22V may be defined in the left-right direction, the width of the second vertical portion 22V may be defined in the front-rear direction, and the thickness of the second vertical portion 22V may be defined in the vertical direction. Meanwhile, the lower end 80bb of the frame 80 may be seated inside the second vertical portion 22V.

The second horizontal portion 22H may protrude into and between the display panel 10 and the optical sheet 32 at the front end of the second vertical portion 22V. The second horizontal portion 22H may be disposed in parallel with the display panel 10 at the rear of the display panel 10. In other words, the length of the second horizontal portion 22H may be defined in the left-right direction, the width of the second horizontal portion 22H may be defined in the vertical direction, and the thickness of the second horizontal portion 22H may be defined in the front-rear direction. Meanwhile, a second front pad FP2 may be located between the display panel 10 and the second horizontal portion 22H, and may be coupled to the front side of the second horizontal portion 22H. In addition, a second rear pad RP2 may be located between the display panel 10 and the optical sheet 32, and may be coupled to the rear side of the second horizontal portion 22H.

Meanwhile, the bottom cover 29 may cover the lower sides of the display panel 10 and the second part 22. The front cover 291 may protrude upward from the front end of the bottom cover 29 and may cover the lower portion of the front side of the display panel 10. A gap pad GP may be located between the front cover 291 and the display panel 10, and may be coupled to the rear side of the front cover 291.

Figure 7:
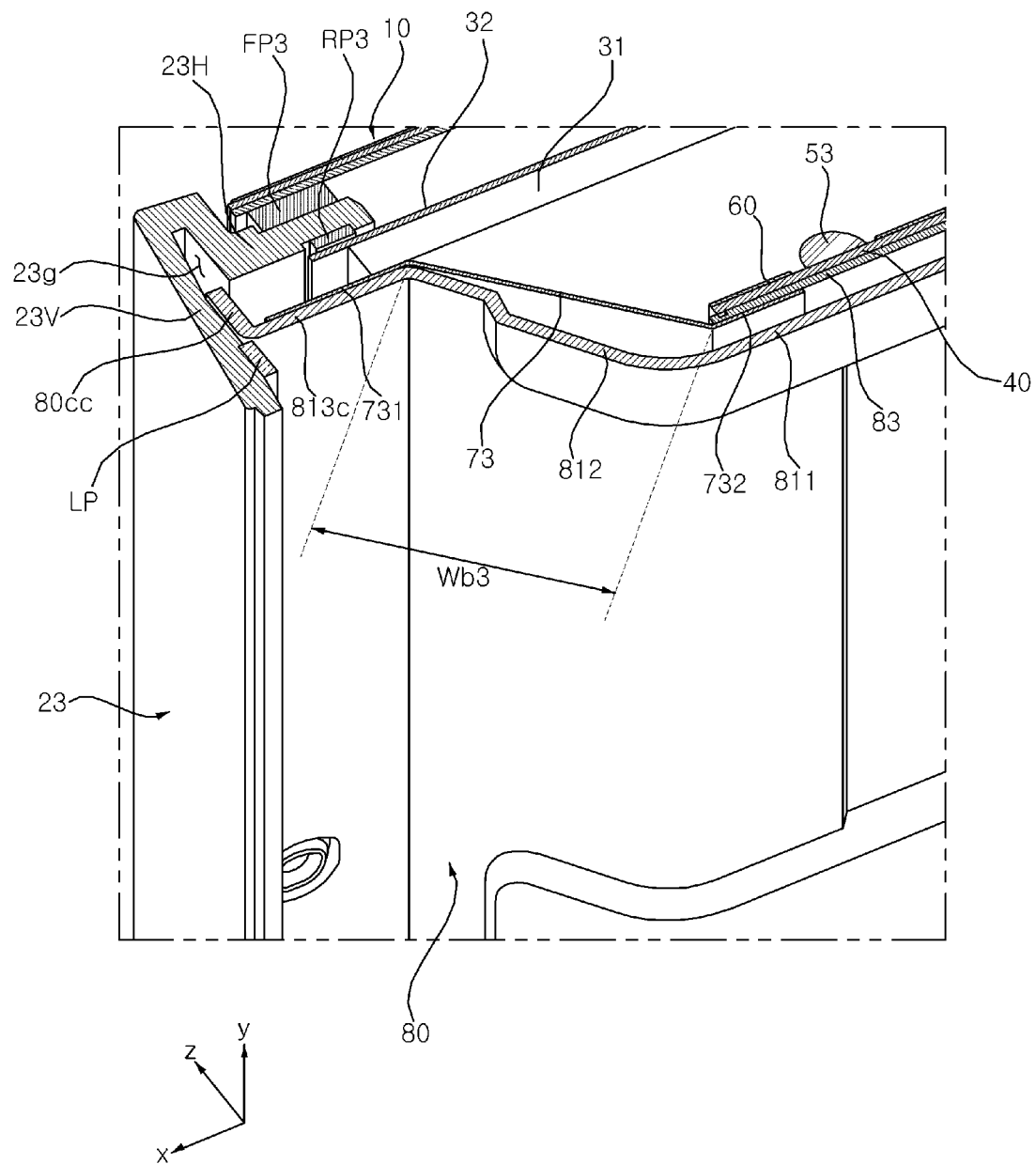

Referring to FIG. 7, the third part 23 may cover the left sides of the display panel 10 and the frame 80. The third part 23 may include a third vertical portion 23V and a third horizontal portion 23H. The third vertical portion 23V and the third horizontal portion 23H may extend longitudinally in the vertical direction.

The third vertical portion 23V may form a left side of the third part 23 and may form a first short side SS1 (see FIG. 1). The third vertical portion 23V may have a width in an intersecting direction with the display panel 10. In other words, the length of the third vertical portion 23V may be defined in the vertical direction, the width of the third vertical portion 23V may be defined in the front-rear direction, and the thickness of the third vertical portion 23V may be defined in the left-right directions. Meanwhile, the third groove 23g may be formed from the rear side of the third vertical portion 23V toward the inside of the third vertical portion 23V, and the left end 80cc of the frame 80 may be inserted thereinto.

The third horizontal portion 23H may protrude into and between the display panel 10 and the optical sheet 32 in the right side of the third vertical portion 23V. The third horizontal portion 23H may be disposed in parallel to the display panel 10 at the rear side of the display panel 10. In other words, the length of the third horizontal portion 23H may be defined in the vertical direction, the width of the third horizontal portion 23H may be defined in the left-right direction, and the thickness of the third horizontal portion 23H may be defined in the front-rear direction. Meanwhile, a third front pad FP3 may be located between the display panel 10 and the third horizontal portion 23H, and may be coupled to the front side of the third horizontal portion 23H. In addition, a third rear pad RP3 may be located between the display panel 10 and the optical sheet 32, and may be coupled to the rear side of the third horizontal portion 23H.

Figure 8:
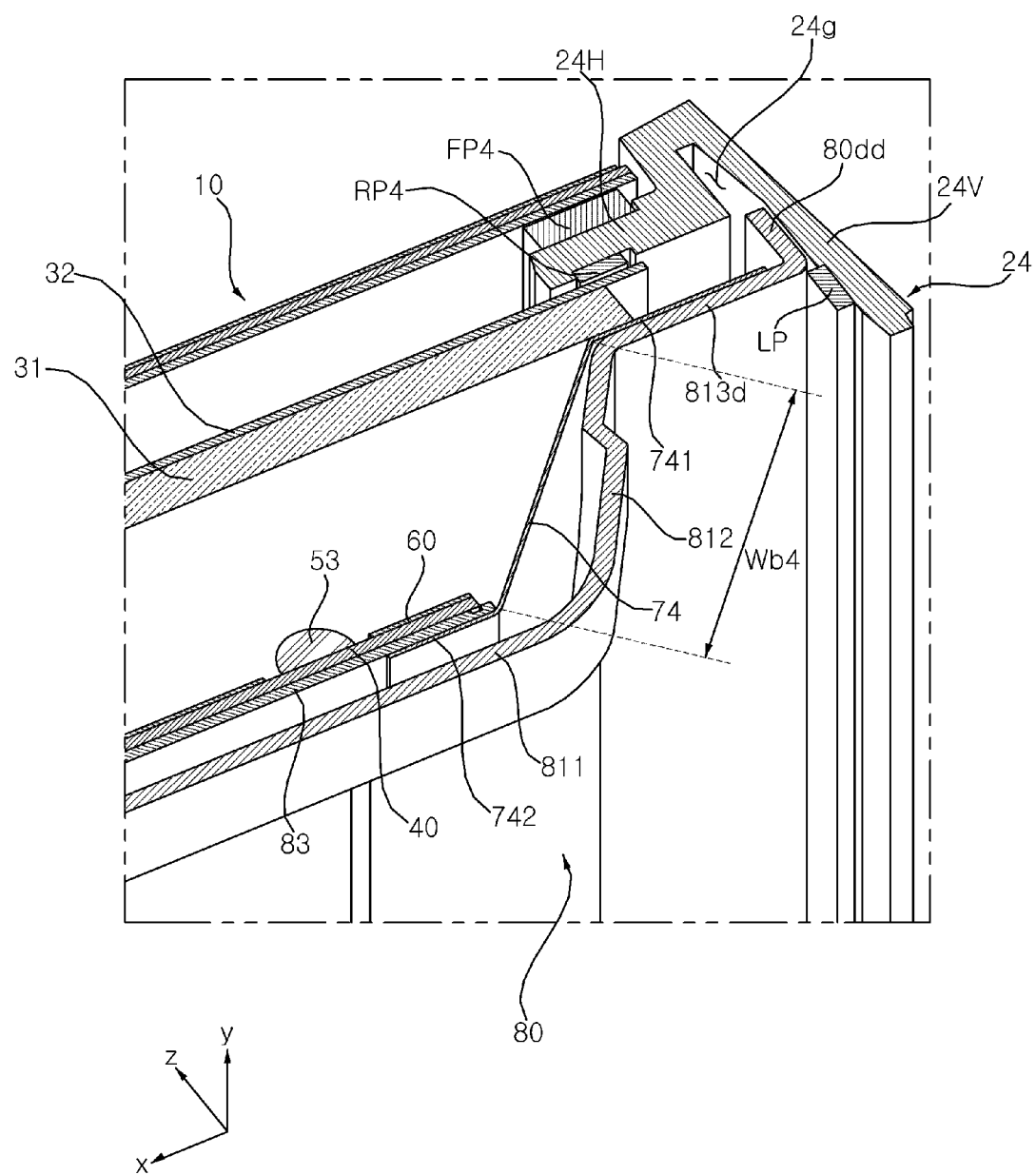

Referring to FIG. 8, a fourth part 24 may cover the right sides of the display panel 10 and the frame 80. The fourth part 24 may include a fourth vertical portion 24V and a fourth horizontal portion 24H. The fourth vertical portion 24V and the fourth horizontal portion 24H may extend longitudinally in the vertical direction.

The fourth vertical portion 24V may form a right side of the fourth part 24 and may form a second short side SS2 (see FIG. 1). The fourth vertical portion 24V may have a width in an intersecting direction with the display panel 10. In other words, the length of the fourth vertical portion 24V may be defined in the vertical direction, the width of the fourth vertical portion 24V may be defined in the front-rear direction, and the thickness of the fourth vertical portion 24V may be defined in the left-right direction. Meanwhile, a fourth groove 24g may be formed from the rear side of the fourth vertical portion 24V toward the inner side of the fourth vertical portion 24V, and a right end 80dd of the frame 80 may be inserted thereinto.

The fourth horizontal portion 24H may protrude into and between the display panel 10 and the optical sheet 32 at the left side of the fourth vertical portion 24V. The fourth horizontal portion 24H may be disposed in parallel to the display panel 10 at the rear side of the display panel 10. In other words, the length of the fourth horizontal portion 24H may be defined in the vertical direction, the width of the fourth horizontal portion 24H may be defined in the left-right direction, and the thickness of the fourth horizontal portion 24H may be defined in the front-rear direction. Meanwhile, a fourth front pad FP4 may be located between the display panel 10 and the fourth horizontal portion 24H, and may be coupled to the front side of the fourth horizontal portion 24H. In addition, the fourth rear pad RP4 may be located between the display panel 10 and the optical sheet 32, and may be coupled to the rear side of the fourth horizontal portion 24H.

Figure 9:
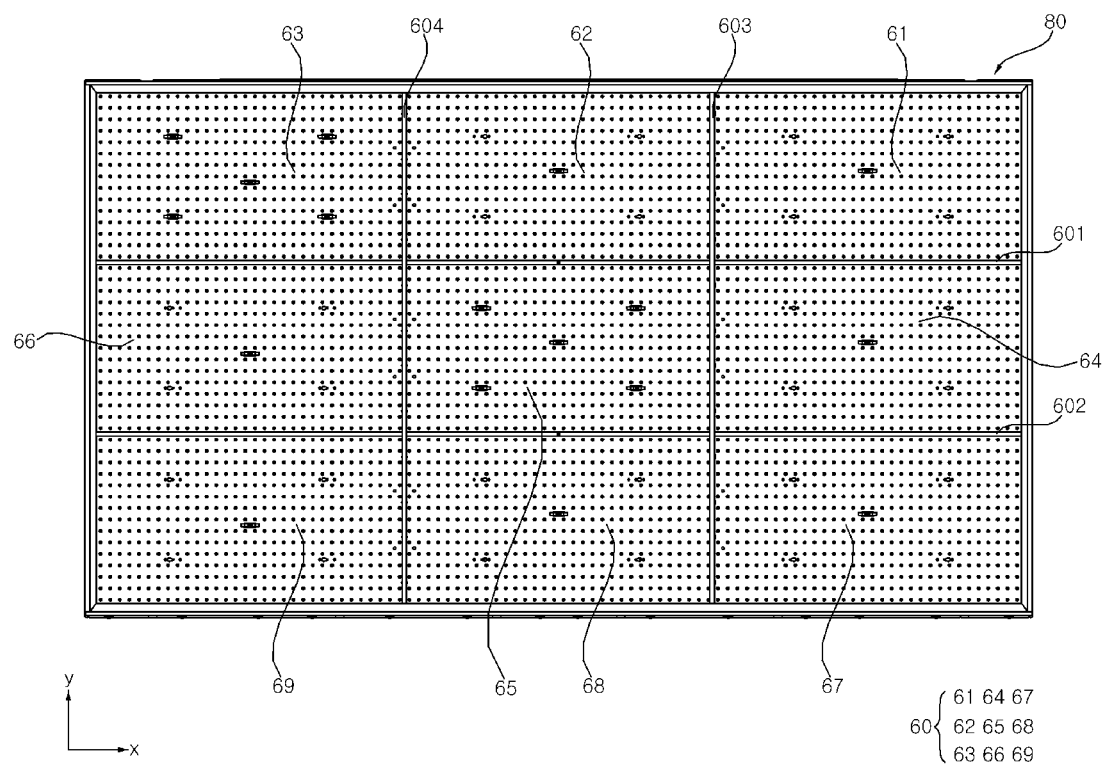
Figure 10:
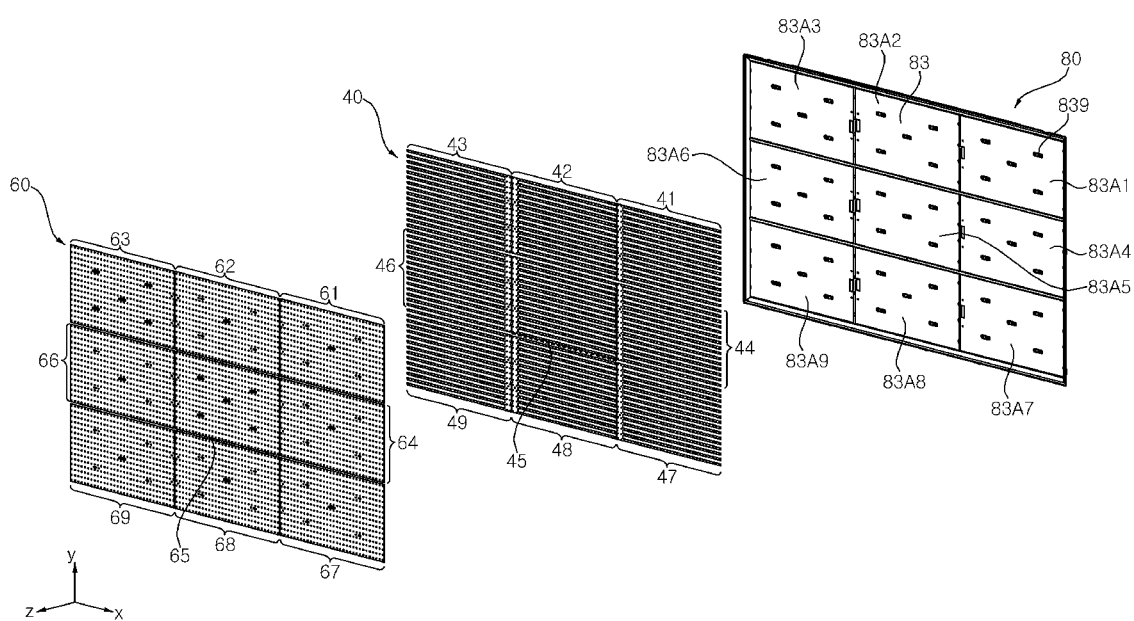

Referring to FIGS. 9 and 10, a heat sink 83 may be located at a front side of the frame 80, and may be coupled to the frame 80. That is, the heat sink 83 may be provided on the front side of the frame 80. The heat sink 83 may cover the central area of the frame 80. The heat sink 83 may provide a flat front surface on which the substrate 40 is installed.

The substrate 40 may be located in front of the heat sink 83, and may be coupled to the heat sink 83. That is, the substrate 40 may be provided on the front side of the heat sink 83. For example, the substrate 40 may include at least one of polyethylene terephthalate (PET), glass, polycarbonate (PC), and silicon. The substrate 40 may be a printed circuit board (PCB). At least one substrate 40 may be provided. The substrate 40 may include a plurality of substrates 40 adjacent to each other. A first substrate 41, a second substrate 42, a third substrate 43, a fourth substrate 44, a fifth substrate 45, a sixth substrate 46, a seventh substrate 47, an eighth substrate 48, and a ninth substrate 49 may be disposed on a virtual horizontal plane (i.e. XY plane). In this case, the heat sink 83 may be divided into a plurality of areas, and each of the plurality of substrates 40 may be coupled to each of the plurality of areas.

The reflective sheet 60 may be a rectangular sheet. The reflective sheet 60 may be located in front of the substrate 40, and may be coupled to the reflective sheet 60. That is, the reflective sheet 60 may be provided on the front side of the substrate 40. For example, the reflective sheet 60 may include at least one of metal and metal oxide which are reflective material. For example, the reflective sheet 60 may include a metal and/or a metal oxide having a high reflectance such as aluminum (Al), silver (Ag), gold (Au), or titanium dioxide (TiO2). As another example, a resin may be deposited or applied on the reflective sheet 60, and may diffuse light from the light source 51 (see FIG. 19). At least one reflective sheet 60 may be provided. The reflective sheet 60 may include a plurality of reflective sheets 60 adjacent to each other. A first reflective sheet 61, a second reflective sheet 62, a third reflective sheet 63, a fourth reflective sheet 64, a fifth reflective sheet 65, a sixth reflective sheet 66, a seventh reflective sheet 67, an eighth reflective sheet 68, and a ninth reflective sheet 69 may be disposed on a virtual horizontal plane (i.e. a XY plane). In this case, each of the plurality of reflective sheets 60 may be coupled to each of the plurality of substrates 40. Accordingly, the reflective sheet 60 may reflect the light of the light source 51 (see FIG. 19) mounted in the substrate 40 in a forward direction.

A first area 83A1 may form a corner where the upper side and the left side of the heat sink 83 meet, and the first substrate 41 and the first reflective sheet 61 may be arranged in the first area 83A1. A second area 83A2 may form a central portion of the upper side of the heat sink 83, and the second substrate 42 and the second reflective sheet 62 may be arranged in the second area 83A2. A third area 83A3 may form a corner where the upper side and the right side of the heat sink 83 meet, and the third substrate 43 and the third reflective sheet 63 may be arranged in the third area 83A3. A fourth area 83A4 may form a central portion of the left side of the heat sink 83, and the fourth substrate 44 and the fourth reflective sheet 64 may be arranged in the fourth area 83A4. A fifth area 83A5 may form a central portion of the heat sink 83, and the fifth substrate 45 and the fifth reflective sheet 65 may be arranged in the fifth area 83A5. A sixth area 83A6 may form a central portion of the right side of the heat sink 83, and the sixth substrate 46 and the sixth reflective sheet 66 may be arranged in the sixth area 83A6. A seventh area 83A7 may form a corner where the left side and the lower side of the heat sink 83 meet, and the seventh substrate 47 and the seventh reflective sheet 67 may be arranged in the seventh area 83A7. An eighth area 83A8 may form a central portion of the lower side of the heat sink 83, and the eighth substrate 48 and the eighth reflective sheet 68 may be arranged in the eighth area 83A8. A ninth area 83A9 may form a corner where the right side and the lower side of the heat sink 83 meet, and the ninth substrate 49 and the ninth reflective sheet 69 may be arranged in the ninth area 83A9.

Figure 11:
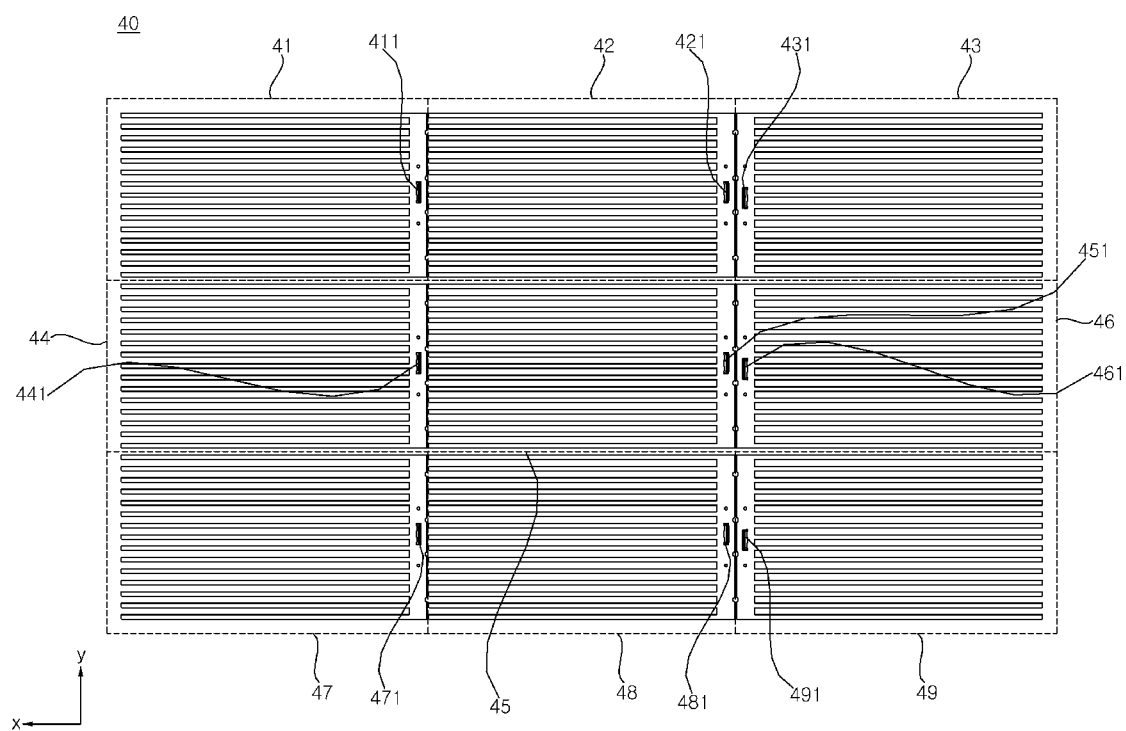

Referring to FIG. 11, connectors 411, 421, 431, 441, 451, 461, 471, 481, and 491 may be mounted on the rear side of the substrate 40, and may be electrically connected to a power device (not shown).

A first connector 411 may be mounted on the rear side of the first substrate 41. A second connector 421 may be mounted on the rear side of the second substrate 42. A third connector 431 may be mounted on the rear side of the third substrate 43. A fourth connector 441 may be mounted on the rear side of the fourth substrate 44. A fifth connector 451 may be mounted on the rear side of the fifth substrate 45. A sixth connector 461 may be mounted on the rear side of the sixth substrate 46. A seventh connector 471 may be mounted on the rear side of the seventh substrate 47. An eighth connector 481 may be mounted on the rear side of the eighth substrate 48. A ninth connector 491 may be mounted on the rear side of the ninth substrate 49.

The second connector 421 may be disposed between the first connector 411 and the third connector 431, and may be adjacent to any one of the first connector 411 and the third connector 431. The fifth connector 451 may be disposed between the fourth connector 441 and the sixth connector 461, and may be adjacent to any one of the fourth connector 441 and the sixth connector 461. The eighth connector 481 may be disposed between the seventh connector 471 and the ninth connector 491, and may be adjacent to any one of the seventh connector 471 and the ninth connector 491.

Meanwhile, connector holes 83*h*, 81*h* (see FIG. 24) may be formed to penetrate the heat sink 83 and a flat plate portion 81, and connectors 411, 421, 431, 441, 451, 461, 471, 481, 491 may be inserted thereinto.

Figure 12:
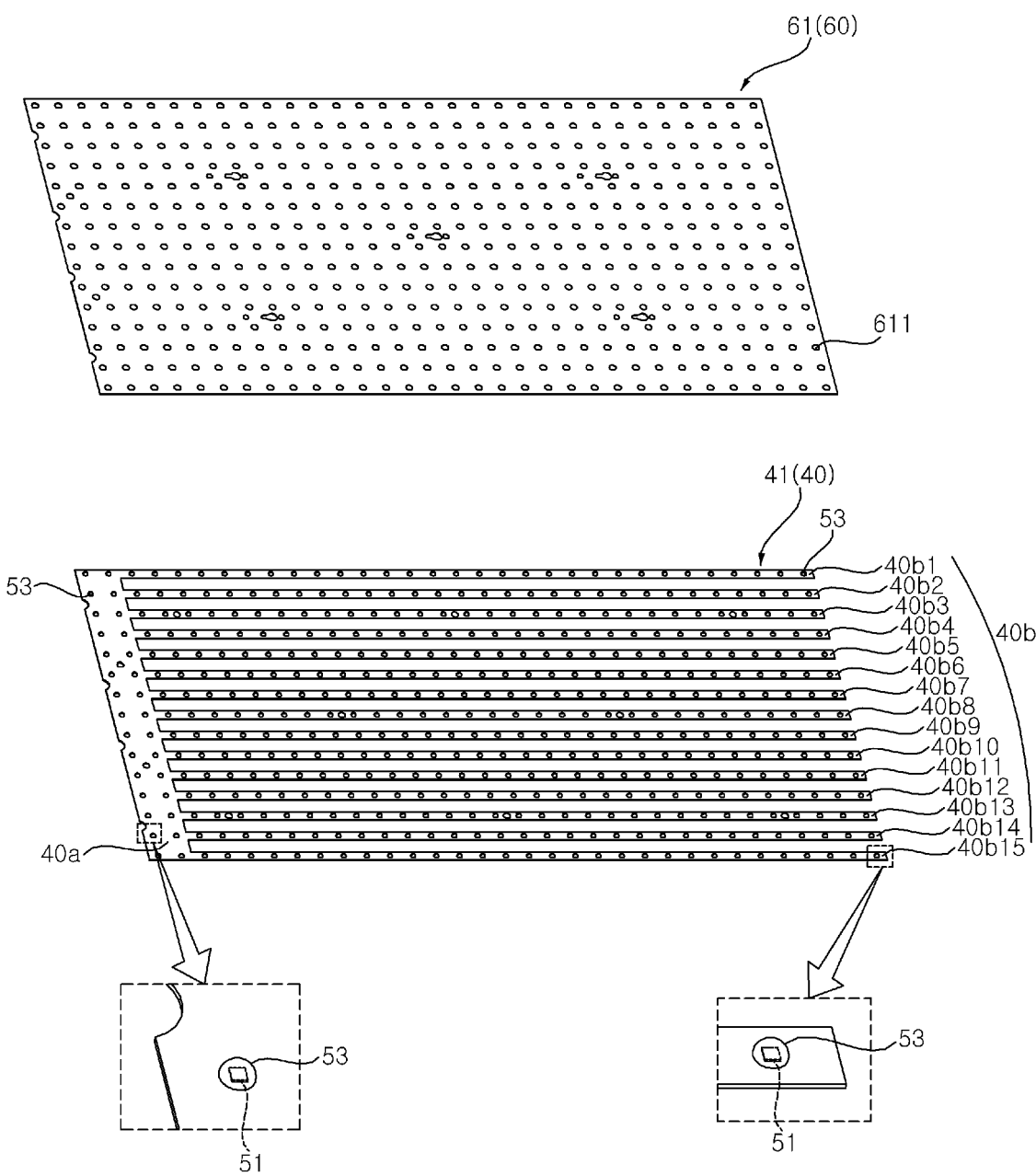

Referring to FIG. 12, the first substrate 41(40) may include a first plate 40*a* and a plurality of second plates 40*b*. The first substrate 41(40) may have a fork-type shape. Meanwhile, the first plate 40*a* may be referred to as a vertical plate or body, and the second plate 40*b* may be referred to as a horizontal plate or rib.

Specifically, the first plate 40*a* may extend longitudinally. For example, the length direction of the first plate 40*a* may be parallel to the vertical direction. The first connector 411 (see FIG. 11) may be mounted on the rear side of the first plate 40*a*. The plurality of second plates 40*b* may extend from one long side of the first plate 40*a* in an intersecting direction with the length direction of the first plate 40*a*, and may be separated from each other in the length direction of the first plate 40*a*. The length direction of a plurality of second plates 40*b* may be parallel to the left-right direction, and the direction in which a plurality of second plates 40*b* are spaced apart from each other may be parallel to the length direction of the first plate 40*a*, i.e. the vertical direction. A length of each of the plurality of second plates 40*b* may be greater than a length of the first plate 40*a*. The width of the first plate 40*a* may be defined in the length direction of the plurality of second plates 40*b*. A width of each of the plurality of second plates 40*b* may be defined in the length direction of the first plate 40*a* and may be smaller than a width of the first plate 40*a*. Meanwhile, the length direction of the plurality of second plates 40*b* may be referred to as a length direction of the substrate 40.

A second-first plate 40*b*1, a second-second plate 40*b*2, a second-third plate 40*b*3, a second-fourth plate 40*b*4, a second-fifth plate 40*b*5, a second-sixth plate 40*b*6, a second-seventh plate 40*b*7, a second-eighth plate 40*b*8, a second-ninth plate 40*b*9, a second-tenth plate 40*b*10, a second-11th plate 40*b*11, second-12th plate 40*b*12, a second-13th plate 40*b*13, a second-14th plate 40*b*14, and a second-15th plate 40*b*15 may be sequentially arranged in the vertical direction.

The plurality of light sources 51 may be mounted on the first plate 40*a* and the plurality of second plates 40*b*, and may be spaced apart from each other. The plurality of light sources 51 form rows and columns and may be located on the first plate 40*a* (see FIGS. 16 and 19) and the plurality of second plates 40*b*. The row may be defined in a left-right direction, and the column may be defined in a vertical direction. For example, the light source 51 may be a light emitting diode (LED) chip or a package including at least one LED chip. For example, the light source 51 may be a colored LED that emits at least one color among colors such as red, blue, and green, or a white LED. As another example, the light source 51 may be a mini LED.

Each of a plurality of lenses 53 may cover each of the plurality of light sources 51. A receiving portion (not pictured) may be formed in the lower side of the lens 53 and may surround the light source 51. A cover portion (not pictured) may form the upper side of the lens 53. For example, the cover portion may have a dome shape or have a shape in which two domes are overlapped. As another example, the lens 53 may be a lens with asymmetric light distribution. The lens 53 may include at least one of resin, silicone, polymethyl methacrylate (PMMA), and polycarbonate (PC). Light provided from the light source 51 may be refracted or reflected by the lens 53 to spread at a beam angle wider than the light source 51. That is, a sufficient amount of light can be secured in a wide range with respect to the number and position of the light sources 51 mounted on the first substrate 41. For example, the lens 53 may be a refractive lens. Meanwhile, the lens 53 may be referred to as a secondary lens.

The size of the first reflective sheet 61(60) may correspond to the size of the first substrate 41(40). For example, the size of the first reflective sheet 61(60) may be substantially equal to the size of the first substrate 41(40). That is, the first reflective sheet 61(60) may cover between the plurality of second plates 40*b*, as well as the first plate 40*a* and the plurality of second plates 40*b* of the first substrate 41. Accordingly, a sufficient amount of light can be secured in a wide range with respect to the number and position of the light source 51 mounted on the first substrate 41(40). Meanwhile, a plurality of lens holes 611 may be formed to penetrate the first reflective sheet 61(60), and a plurality of lenses 53 may be disposed.

Meanwhile, the description of the first substrate 41(40) and the first reflective sheet 61(60) described above may be identically applied to the remaining substrates 42, 43, 44, 45, 46, 47, 48, 49 (see FIG. 10) and the remaining reflective sheets 62, 63, 64, 65, 66, 67, 68, 69 (see FIG. 10).

For example, the first substrate 41(40) may have substantially the same shape as the remaining substrates 42, 43, 44, 45, 46, 47, 48, 49 (see FIG. 10). For example, one substrate may be separated into any two of the substrates 40 through a cutting process. Accordingly, the manufacturing cost of the substrate 40 may be reduced.

Figure 13:
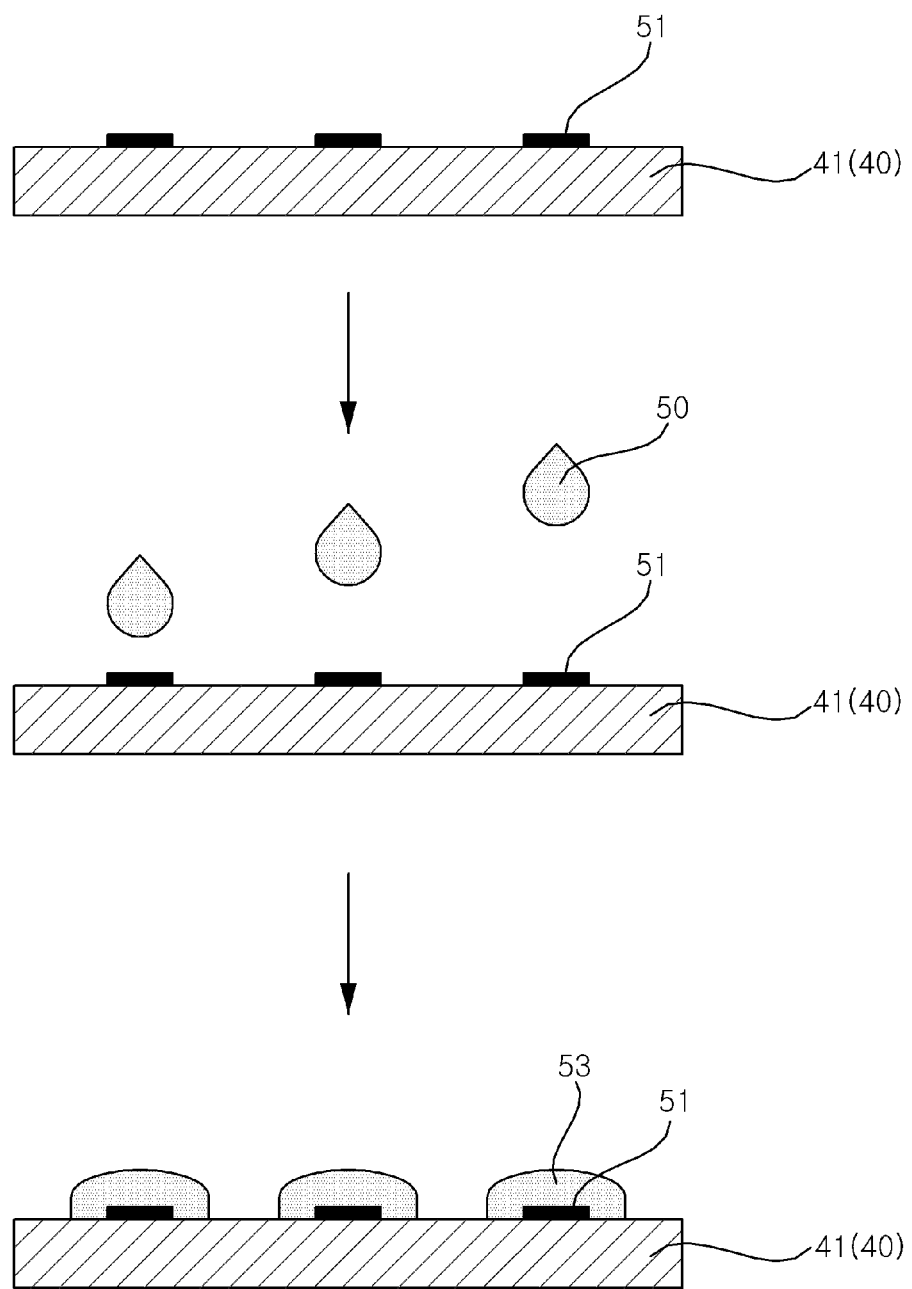

Referring to FIGS. 12 and 13, the plurality of light sources 51 may be adhered or bonded to the first substrate 41(40), and may be spaced apart from each other. A mixture 50 may be dispensed to each of the plurality of light sources 51 mounted on the first substrate 41(40). For example, the mixture 50 may include a silicone encapsulant. The plurality of lenses 53 may be formed by curing the mixture 50 and may be spaced apart from each other.

Accordingly, each of the plurality of lenses 53 may surround each of the plurality of light sources 51. In addition, the plurality of lenses 53 may be fixed on the first substrate 41(40) with high adhesive strength and hardness. In addition, the lens 53 may increase the light extraction efficiency of the light source 51 and may function as an optical system.

Figure 14:
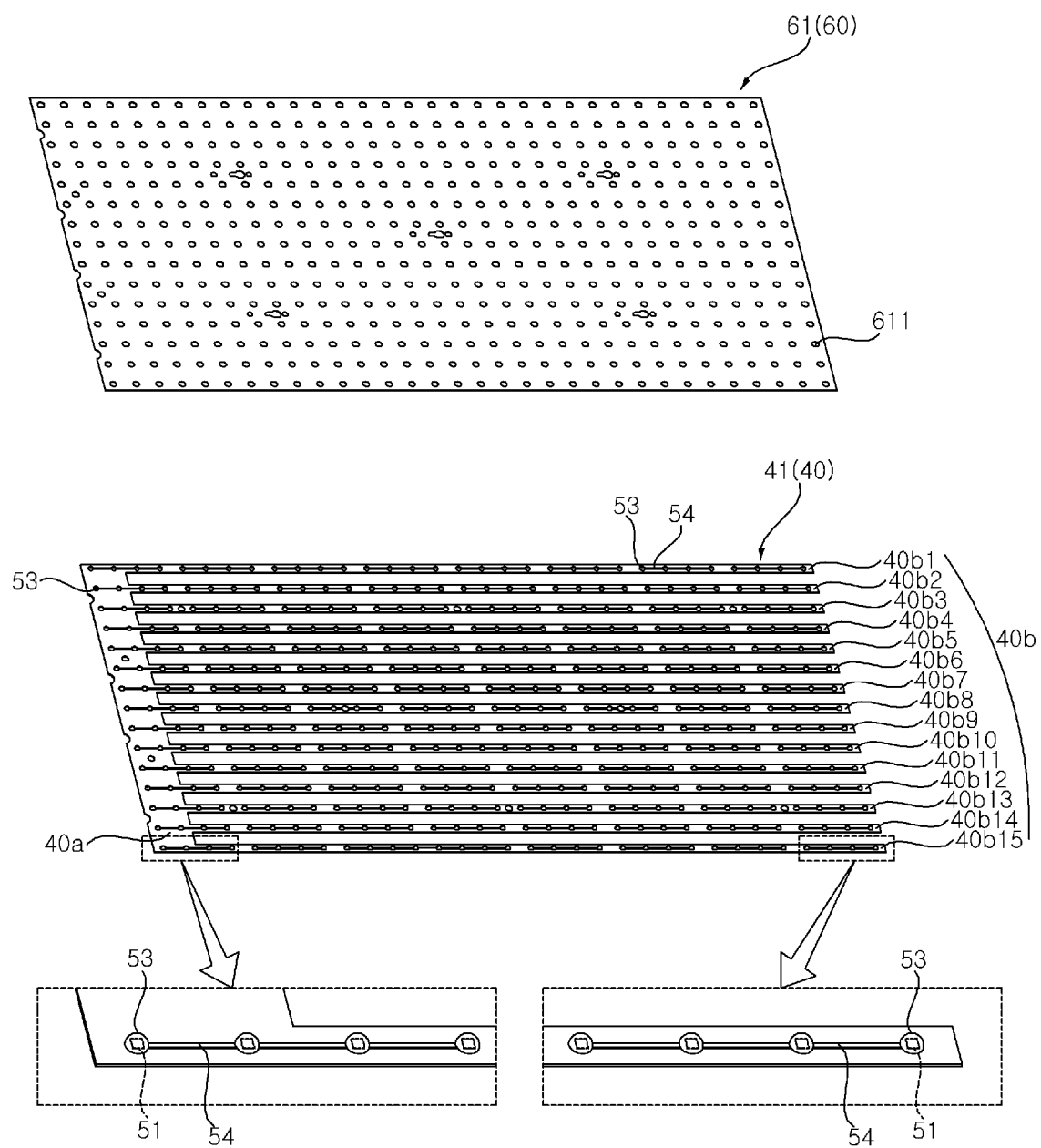
Figure 15:
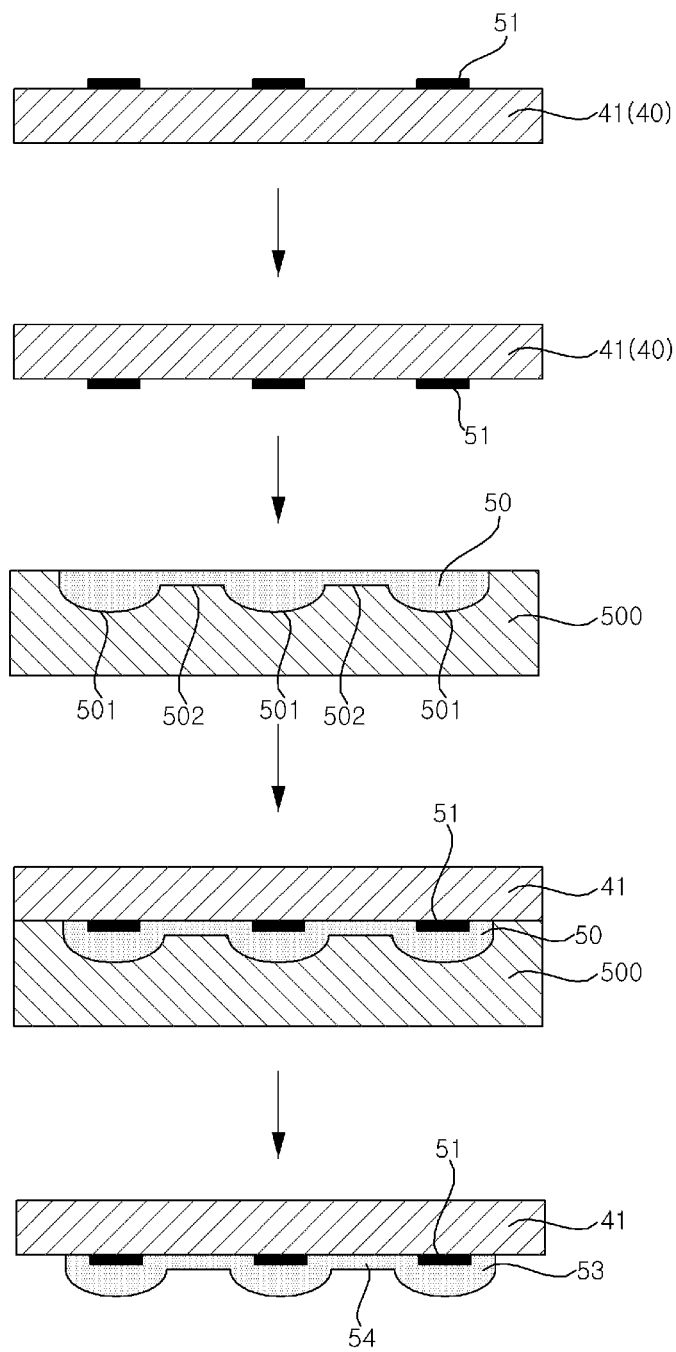

Referring to FIGS. 14 and 15, the plurality of light sources 51 may be adhered or bonded to the first substrate 41(40), and may be spaced apart from each other. The mixture 50 may be injected into a plurality of grooves 501 and 502 of a mold 500. For example, the mixture 50 may include a silicone encapsulant. The plurality of grooves 501 and 502 may be formed while being recessed from one surface of the mold 500 to the inner side of the mold 500. The plurality of first grooves 501 may face the plurality of light sources 51 mounted on the first substrate 41. The plurality of second grooves 502 may connect between the plurality of first grooves 501, and may extend long. One side on which the light sources 51 of the first substrate 41 are mounted and one side on which the grooves 501 and 502 of the mold 500 are formed face each other and may be in contact with each other at a low pressure, and the mixture 50 may be located between the first substrate 41 and the plurality of grooves 501 and 502. In this case, each of the plurality of light sources 51 may be submerged in the mixture 50 injected into each of the plurality of first grooves 501. The plurality of lenses 53 and a plurality of bars 54 may be formed by curing the mixture 50. Meanwhile, the bar 54 may be referred to as a connector or a runner.

Accordingly, each of the plurality of lenses 53 may surround each of the plurality of light sources 51. The plurality of bars 54 may connect between the plurality of lenses 53. In addition, the plurality of lenses 53 and the plurality of bars 54 may be fixed on the first substrate 41 with high adhesive strength and hardness. In addition, the lens 53 may improve the light output of the light source 51 and may function as an optical system. In addition, the productivity of the lens 53 and the bar 54 may be improved.

In this case, the shape of the lens 53 may correspond to the shape of the first groove 501. For example, the lens 53 may have a dome shape. As another example, the lens 53 may have a shape in which two convex domes overlap. For example, the lens 53 may be a lens with asymmetric light distribution.

Figure 16:
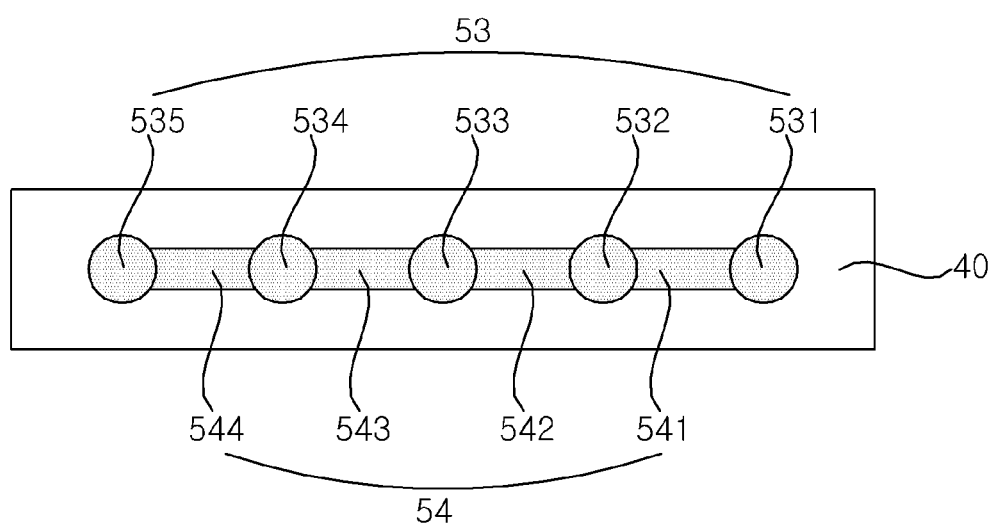

Referring to FIG. 16, the plurality of lenses 53 may be spaced apart from each other in the left-right direction. The bar 54 may be located between the plurality of lenses 53, and may extend in the left-right direction to connect the plurality of lenses 53. That is, two or more lenses 53 may be connected to each other by one or more bars 54. The bar 54 and the lenses 53 may be arranged with each other in the left-right direction. The bar 54 and the lens 53 may be formed of the same material or may be formed as one body.

For example, the plurality of lenses 53 may form one group by four lenses in the left-right direction (see FIG. 14). In this case, three bars 54 may be provided for each group, and lenses 53 belonging to the group may be connected to each other by the bars 54.

As another example, the plurality of lenses 53 may form one group by five lenses in the left-right direction (see FIG. 16). In this case, the four bars 54 may be provided for each group, and the lenses 53 belonging to the group may be connected to each other by the bars 54. A first lens 531, a second lens 532, a third lens 533, a fourth lens 534, and a fifth lens 535 may be sequentially arranged in the left-right direction. The first bar 541 may connect the first lens 531 and the second lens 532, and the second bar 542 may connect the second lens 532 and the third lens 533. The third bar 543 may connect the third lens 533 and the fourth lens 534, and the fourth bar 544 may connect the fourth lens 534 and the fifth lens 535.

Meanwhile, the plurality of bars 54 may be disposed to overlap each other in the lengthwise direction of the first plate 40a, i.e. in the vertical direction (see FIG. 14). Alternatively, the plurality of bars 54 may be alternately disposed in the lengthwise direction of the first plate 40a, i.e. in the vertical direction. The arrangement of the bars 54 may be equally applied to the arrangement of the bars 55, 56, 57, 58, 59 (see FIGS. 17 and 18) described later.

Figure 17:
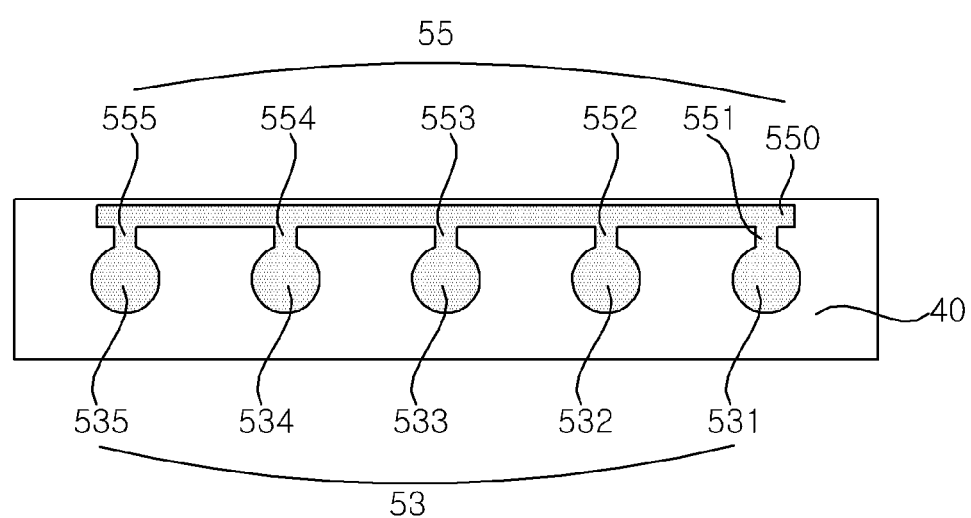

Referring to FIG. 17, the plurality of lenses 53 may be spaced apart from each other in the left-right direction. The bar 55 may be connected to the plurality of lenses 53 at an upper side or a lower side of the plurality of lenses 53. That is, two or more lenses 53 may be connected to each other by one or more bars 55. The bar 55 and the lens 53 may be formed of the same material or may be formed as one body.

The bar 55 may include a body 550 and legs. The body 550 may be located in the upper side or lower side of the lenses 53, and may extend longitudinally in the left-right direction. The length of the body 550 may be proportional to the number of lenses 53 connected to the bar 55. The length of the body 550 may correspond to a distance between the leftmost lens and the rightmost lens among the lenses 53 connected to the bar 55. The legs may be located between one end and the other end of the body 550, and may extend in a direction perpendicular to the lengthwise (or longitudinal) direction of the body 550 and be connected to the lenses 53. In some embodiments, the leg may also be referred to as a bridge.

For example, the plurality of lenses 53 may form a group with five lenses in the left-right direction. In this case, one body 550 and five legs 551, 552, 553, 554, 555 may be provided for each group, and the lenses 53 belonging to the group may be connected by the body 550 and the legs 551, 552, 553, 554, and 555. The first lens 531, the second lens 532, the third lens 533, the fourth lens 534, and the fifth lens 535 may be sequentially arranged in the left-right direction. The body 550 may extend as much as a length corresponding to the distance between the first lens 531 and the fifth lens 535. The first leg 551, the second leg 552, the third leg 553, the fourth leg 554, and the fifth leg 555 may be sequentially disposed between one end and the other end of the body 550 and may be formed in one side of the body 550 facing the lenses 53. The first leg 551 may protrude toward the first lens 531 from the one side of the body 550, and may be connected to the first lens 531. The second leg 552 may protrude toward the second lens 532 from the one side of the body 550, and may be connected to the second lens 532. The third leg 553 may protrude toward the third lens 533 from the one side of the body 550, and may be connected to the third lens 533. The fourth leg 554 may protrude toward the fourth lens 534 from the one side of the body 550, and may be connected to the fourth lens 534. The fifth leg 555 may extend toward the fifth lens 535 from the one side of the body 550, and may be connected to the fifth lens 535.

Figure 18:
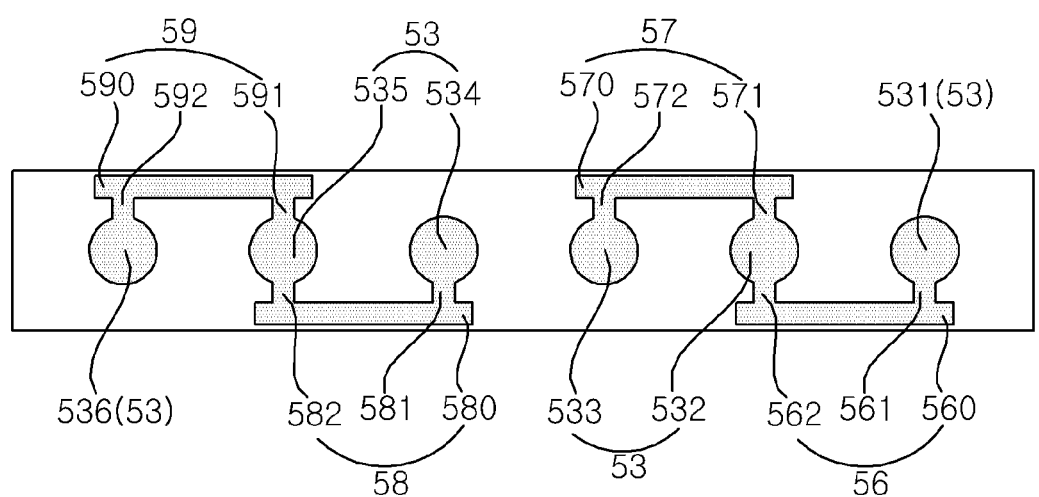

Referring to FIG. 18, the plurality of lenses 53 may be spaced apart from each other in the left-right direction. Bars 56, 57, 58, and 59 may be alternately connected to upper and lower sides of the plurality of lenses 53. A lower bar 56, 58 may be connected to the plurality of lenses 53 from the lower side of the plurality of lenses 53. An upper bar 57, 59 may be connected to the plurality of lenses 53 from the upper side of the plurality of lenses 53. That is, three or more lenses 53 may be connected to each other by one or more lower bars 56 and 58 and one or more upper bars 57 and 59. The bar 56, 57, 58, 59 and the lens 53 may be formed of the same material or may be formed as one body.

The lower bar 56, 58 may include a lower body 560, 580 and lower legs. The lower body 560, 580 may be located in the lower side of the lenses 53 and may extend longitudinally in the left-right direction. The length of the lower body 560, 580 may be proportional to the number of lenses 53 connected to the lower bar 56, 58. The length of the lower body 560, 580 may correspond to a distance between the leftmost lens and the rightmost lens among the lenses 53 connected to the lower bar 56, 58. The lower legs may be located between one end and the other end of the lower body 560, 580, and may extend in an intersecting direction with the length direction of the lower body 560, 580 and be connected to the lenses 53. In some embodiments, the lower leg may be referred to as a lower bridge.

The upper bar 57, 59 may include an upper body 570, 590 and upper legs. The upper body 570, 590 may be located in the upper side of the lenses 53, and may extend longitudinally in the left-right direction. The length of the upper body 570, 590 may be proportional to the number of lenses 53 connected to the upper bar 57, 59. The length of the upper body 570, 590 may correspond to a distance between the leftmost lens and the rightmost lens among the lenses 53 connected to the upper bar 57, 59. The upper legs may be located between one end and the other end of the upper body 570, 590, and may extend in an intersecting direction with the length direction of the upper body 570, 590 and be connected to the lenses 53. In some embodiments, the upper leg may be referred to as an upper bridge.

For example, the plurality of lenses 53 may form a group with three lenses in the left-right direction. For example, the first lens 531(53), the second lens 532, and the third lens 533 may form a first group, the fourth lens 534, the fifth lens 535, and the sixth lens 536 may form a second group.

The first lower bar 56 and the first upper bar 57 may be provided in the first group. For example, the first lower bar 56 may be symmetrical with the first upper bar 57 with respect to the second lens 532. The first lower bar 56 may include a first lower body 560, a first lower leg 561, and a second lower leg 562. The first upper bar 57 may include a first upper body 570, a first upper leg 571, and a second upper leg 572.

The first lower body 560 may extend by a length corresponding to a distance between the first lens 531 and the second lens 532. The first lower leg 561 may be adjacent to one end of the first lower body 560, and the second lower leg 562 may be adjacent to the other end of the first lower body 560. The first lower leg 561 may protrude toward the first lens 531 from one side of the first lower body 560 and may be connected to the first lens 531. The second lower leg 562 may protrude toward the second lens 532 from one side of the first lower body 560 and may be connected to the second lens 532.

The first upper body 570 may extend by a length corresponding to the distance between the second lens 532 and the third lens 533. The first upper leg 571 may be adjacent to one end of the first upper body 570, and the second upper leg 572 may be adjacent to the other end of the first upper body 570. The first upper leg 571 may protrude toward the second lens 532 from one side of the first upper body 570 and may be connected to the second lens 532. The second upper leg 572 may protrude toward the third lens 533 from one side of the first upper body 570 and may be connected to the third lens 533.

The second lower bar 58 and the second upper bar 59 may be provided in the second group. For example, the second lower bar 58 may be symmetrical with the second upper bar 59 with respect to the fifth lens 535. The second lower bar 58 may include a second lower body 580, a third lower leg 581, and a fourth lower leg 582. The second upper bar 59 may include a second upper body 590, a third upper leg 591, and a fourth upper leg 592.

The second lower body 580 may extend by a length corresponding to a distance between the fourth lens 534 and the fifth lens 535. The third lower leg 581 may be adjacent to one end of the second lower body 580, and the fourth lower leg 582 may be adjacent to the other end of the second lower body 580. The third lower leg 581 may protrude toward the fourth lens 534 from one side of the second lower body 580 and may be connected to the fourth lens 534. The fourth lower leg 582 may protrude toward the fifth lens 535 from one side of the second lower body 580 and may be connected to the fifth lens 535.

The second upper body 590 may extend by a length corresponding to a distance between the fifth lens 535 and the sixth lens 536(53). The third upper leg 591 may be adjacent to one end of the second upper body 590, and the fourth upper leg 592 may be adjacent to the other end of the second upper body 590. The third upper leg 591 may protrude toward the fifth lens 535 from one side of the second upper body 590 and may be connected to the fifth lens 535. The fourth upper leg 592 may protrude toward the sixth lens 536(53) from one side of the second upper body 590 and may be connected to the sixth lens 536.

Figure 19:
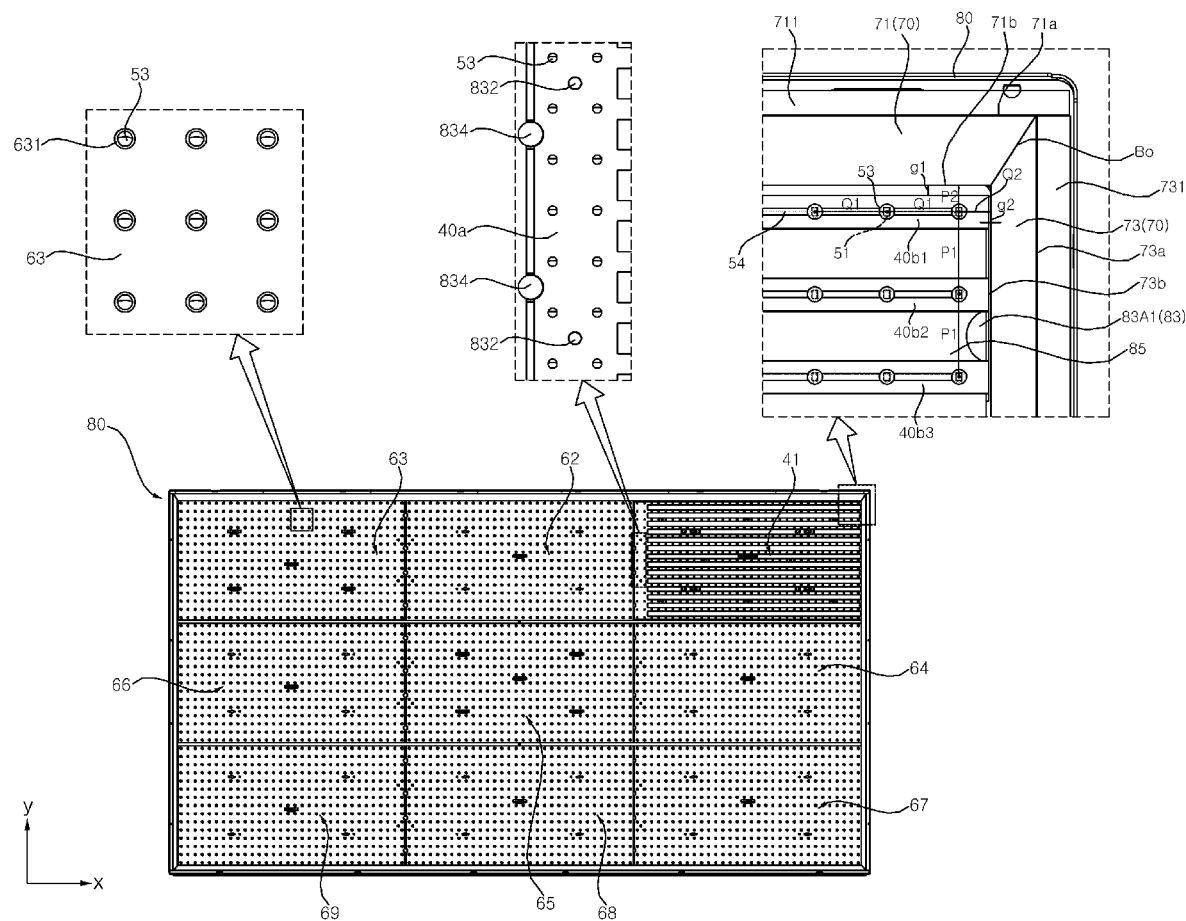

Referring to FIGS. 10 and 19, the first substrate 41 may be coupled to a first area 83A1(83) of the heat sink 83, and the first reflective sheet 61 may be coupled to the first substrate 41. A first adhesive member 85 may be coupled to the heat sink 83 and the first substrate 41, at between the heat sink 83 and the first substrate 41. For example, the adhesive member 85 may be a double-sided tape. A second adhesive member (not shown) may be coupled to the first substrate 41 and the first reflective sheet 61, at between the first substrate 41 and the first reflective sheet 61. For example, the second adhesive member may be a double-sided tape. Accordingly, the first substrate 41 and the first reflective sheet 61 may be modularized, and the coupling process of the first substrate 41 and the first reflective sheet 61 with respect to the heat sink 83 may be efficiently improved.

The plurality of light sources 51 may be mounted on the first plate 40a and the plurality of second plates 40b, and may be spaced apart from each other. For example, the plurality of light sources 51 may be spaced apart from each other by a first gap P1 in the vertical direction, and may be spaced apart from each other by a second gap Q1 in the left-right direction. The first gap P1 and the second gap Q1 may be greater than a gap between the plurality of second plates 40b. For example, the first gap P1 may be substantially equal to the second gap Q1.

Meanwhile, the description of the first substrate and the first reflective sheet 61 described above may be identically applied to the remaining substrates 42, 43, 44, 45, 46, 47, 48, 49 (see FIG. 7) and the remaining reflective sheets 62, 63, 64, 65, 66, 67, 68, 69. In addition, the description of the coupling of the first substrate 41 and the first reflective sheet 61 with respect to the heat sink 83 may be identically applied to the coupling of the remaining substrates 42, 43, 44, 45, 46, 47, 48, 49 (see FIG. 7) and the remaining reflective sheets 62, 63, 64, 65, 66, 67, 68, 69 with respect to the heat sink 83.

Figure 20:
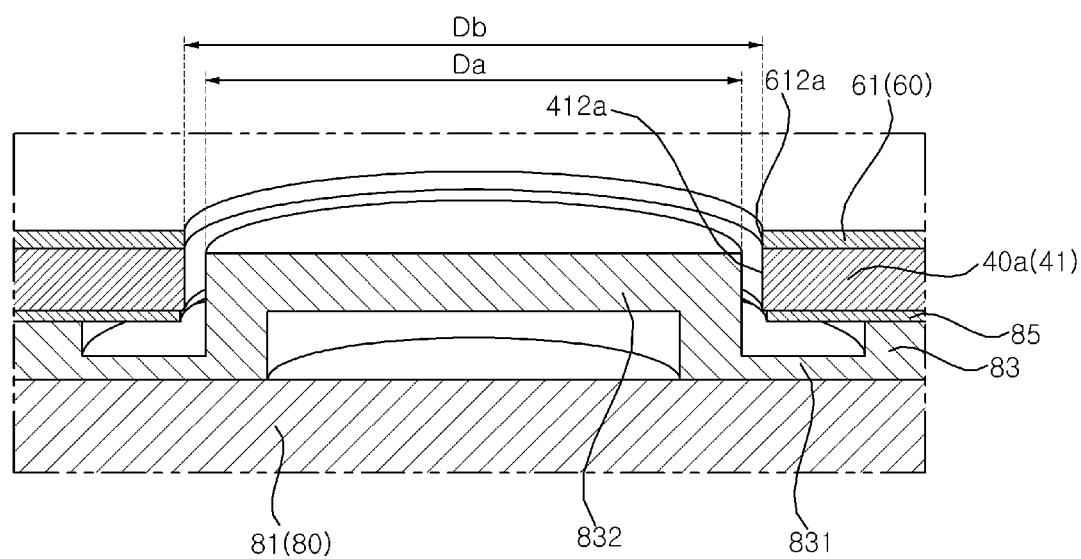

Referring to FIGS. 19 and 20, a plurality of pins 832 may protrude from a flat plate portion 81 and/or the heat sink 83 of the frame 80 toward the first plate 40a of the first substrate 41, and may be spaced apart from each other in the vertical direction. The plurality of pins 832 may penetrate the first substrate 41 and the first reflective sheet 61.

For example, a recessed portion 831a may be formed while being recessed backward from the heat sink 83, and the pin 832 may be formed while being pressed forward from the recessed portion 831a. Accordingly, the pin 832 may be provided as a straight protrusion. Meanwhile, the recessed portion 831 may be referred to as a carving portion. In this case, the first hole 412a may be formed by penetrating the first plate 40a of the first substrate 41 in the front-rear direction, and the second hole 612a may be formed by penetrating the first reflective sheet 61 in the front-rear direction. The first hole 412a and the second hole 612a may be arranged with each other in the front-rear direction and may have substantially the same diameter Db. In addition, the pin 832 may have a diameter Da that is substantially equal to or smaller than the diameter Db of the first hole 412a, and may be inserted into the first hole 412a and the second hole 612a. For example, the diameter Db may be larger than the diameter Da by 0.2 mm.

Accordingly, the pin 832 may guide the coupling of the first substrate 41 and the first reflective sheet 61 with respect to the heat sink 83.

A plurality of bosses 834 may protrude forward from the heat sink 83, and may be spaced apart from each other in the vertical direction. The plurality of bosses 834 may be disposed between adjacent substrates 40.

For example, the boss 834 may be located between the first substrate 41 and the second substrate 42 (see FIG. 10). In this case, a first groove (not pictured) may be formed in each of a side facing the boss 834 of the first substrate 41 and a side facing the boss 834 of the first reflective sheet 61 (see FIG. 10). In addition, a second groove (not pictured) may be formed in each of a side facing the boss 834 of the second substrate 42 and a side facing the boss 834 of the second reflective sheet 62. The boss 834 may be inserted between the first groove and the second groove.

Accordingly, the boss 834 may guide the coupling of the first and second substrates 41 and 42 and the first and second reflective sheets 61 and 62 with respect to the heat sink 83.

Meanwhile, a configuration such as the above-described pin 832 and boss 834 may be provided to guide the coupling of the remaining substrates 42, 43, 44, 45, 46, 47, 48, 49 (see FIG. 10) and the remaining reflective sheets 62, 63, 64, 65, 66, 67, 68, 69 in addition to the first substrate 41 and the first reflective sheet 61 with respect to the heat sink 83.

Figure 21:
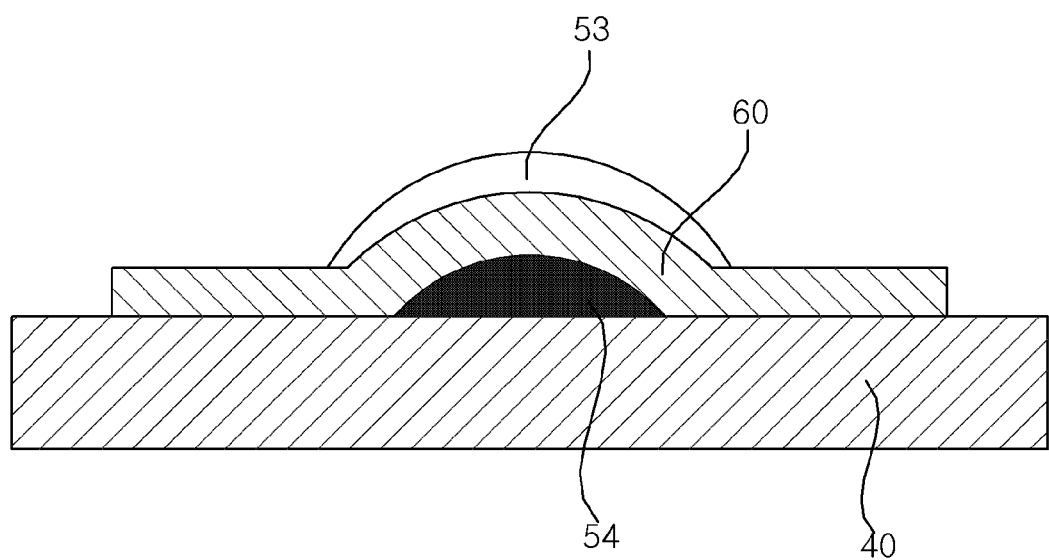
Figure 22:
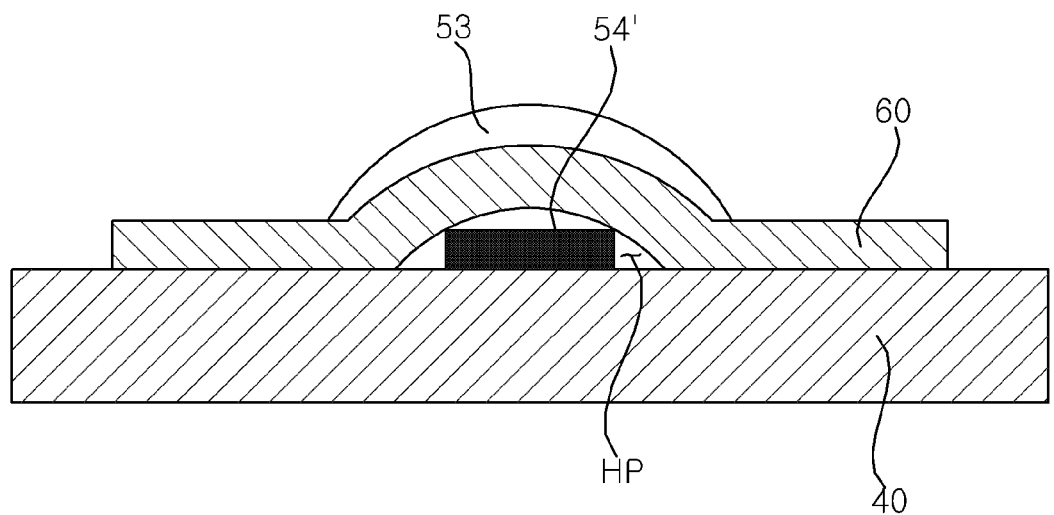

Referring to FIGS. 21 and 22, the reflective sheet 60 may be located on or adhered to the substrate 40 and the bar 54, 54', and the lens 53 may penetrate a lens hole 611 (see FIG. 14) of the reflective sheet 60.

As an example, with reference to FIG. 21, the bar 54 may have a rounded surface. In this case, the reflective sheet 60 may be in close contact with the bar 54. Accordingly, adhesion of the reflective sheet 60 to the substrate 40 may be improved. In addition, the lens 53 may be prevented from separating from the substrate 40.

As another example with reference to FIG. 22, a bar 54' may have an angled surface. In this case, a space or air bubble HP may be generated between the reflective sheet 60 and the bar 54'. That is, compared to a case where the reflective sheet 60 is adhered to the bar 54, the adhesion of the reflective sheet 60 with respect to the substrate 40 may be reduced.

Figure 23:
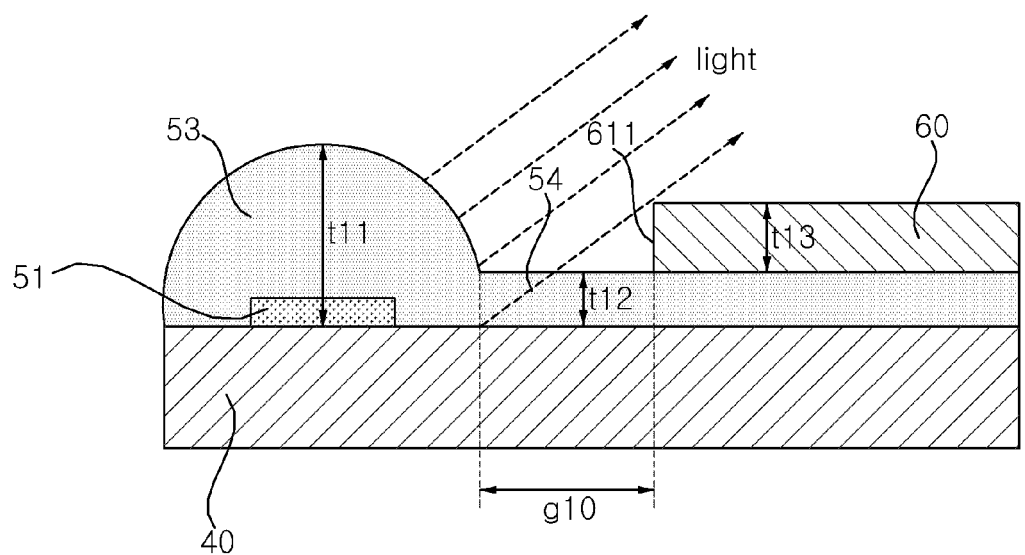

Referring to FIG. 23, the lens 53 may be spaced apart from a portion forming the lens hole 611 of the reflective sheet 60 by a certain gap g10. As an example, the gap g10 may be 1,000 micrometers.

A height t11 of the lens 53 with respect to the substrate 40 may be greater than the sum of a thickness t12 of the bar 54 and a thickness t13 of the reflective sheet 60. As an example, the sum of the thickness t12 of the bar 54 and the thickness t13 of the reflective sheet 60 may be less than half of the height t11 of the lens 53. As another example, the sum of the thickness t12 of the bar 54 and the thickness t13 of the reflective sheet 60 may be less than ⅓ of the height t11 of the lens 53. As a non-limiting example, the sum of the thickness t12 of the bar 54 and the thickness t13 of the reflective sheet 60 may be 325 micrometers, and the height t11 of the lens 53 may be 1,000 micrometers.

Accordingly, it is possible to minimize the loss of light emitted from the lens 53 by the reflective sheet 60.

Figure 24:
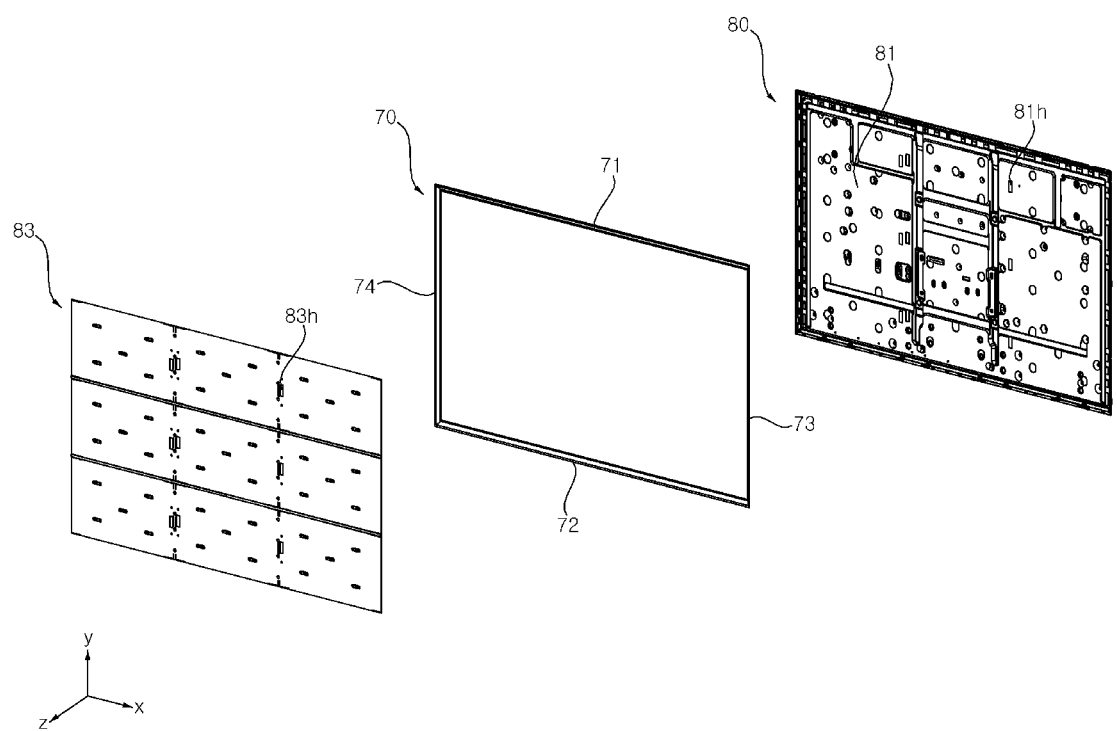

Referring to FIG. 24, the frame 80 may include a flat plate portion 81. The flat plate portion 81 may form a central area of the frame 80. The heat sink 83 may be located in front of the flat plate portion 81 and may be coupled to the flat plate portion 81. That is, the heat sink 83 may be provided on the front side of the flat plate portion 81. Meanwhile, a rigid portion (not pictured) may be formed while being pressed in the frame 80, and may improve torsional rigidity and/or bending rigidity of the frame 80.

A side portion 70 may be disposed in an edge of the heat sink 83. The side portion 70 may include at least one of a metal and a metal oxide which are reflective materials. For example, the side portion 70 may include a metal having a high reflectance such as at least one of aluminum (Al), silver (Ag), gold (Au), and titanium dioxide (TiO 2) and/or a metal oxide. As another example, a resin may be deposited or coated on the side portion 70, and may diffuse light from the light source 51 (see FIG. 19).

In addition, the side portion 70 may include a first side portion 71, a second side portion 72, a third side portion 73, and a fourth side portion 74. The first side portion 71 may extend along the upper side of the heat sink 83. The second side portion 72 may extend along the lower side of the heat sink 83. The third side portion 73 may extend along the left side of the heat sink 83. The fourth side portion 74 may extend along the right side of the heat sink 83. In some embodiments, the side portion 70 may be referred to as a chamfer portion.

Figure 25:
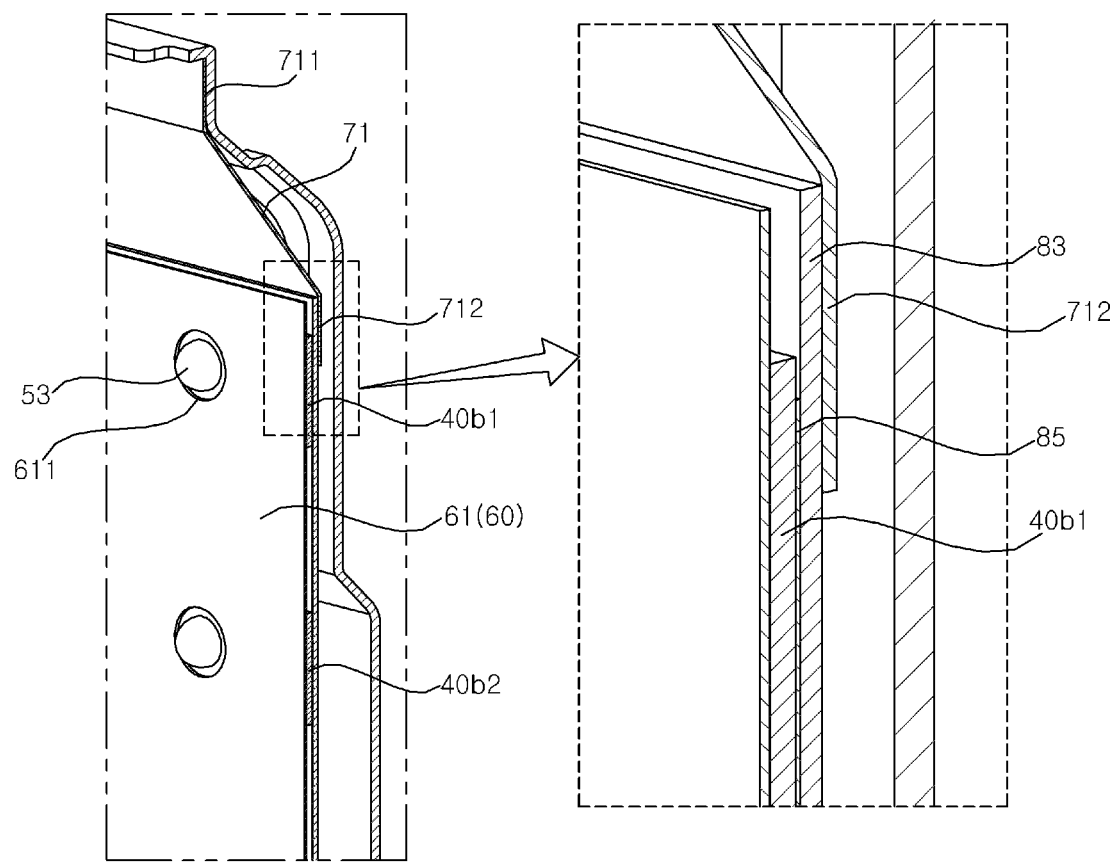

Referring to FIGS. 5 and 25, the frame 80 may include a press portion 811, a bending portion 812, and a first support portion 813a. The press portion 811 may be formed while being pressed from the front side of the frame 80 to the rear. The press portion 811 may be spaced rearward from the heat sink 83. The bending portion 812 may be angled from the press portion 811 toward the display panel 10. An angle between the bending portion 812 and the press portion 811 may be an obtuse angle. The first support portion 813a may be angled toward the first part 21 from the bending portion 812. The first support portion 813a may be disposed in parallel to the first horizontal portion 21H at the rear side of the first horizontal portion 21H. In addition, a coupling portion 21I may protrude from the first horizontal portion 21H toward the first support portion 813a, and may be coupled to the first horizontal portion 21H through a fastening member such as a screw. Meanwhile, the abovementioned upper end 80aa of the frame 80 may protrude from the first support portion 813a toward the first groove 21g. In addition, a light shield pad LP may face the upper end 80aa of the first support portion 813a and may be coupled to the inner side of the first vertical portion 21V.

The first side portion 71 may extend along the upper side of the heat sink 83 and may be disposed to be inclined toward the display panel 10 with respect to the heat sink 83. The first side portion 71 may form an obtuse angle with respect to the heat sink 83. In other words, the length of the first side portion 71 may be defined in the left-right direction, the width Wb1 of the first side portion 71 may be defined in a direction forming an obtuse angle with respect to the heat sink 83, and the thickness of the first side portion 71 may be defined in a direction orthogonal to the length direction and the width direction of the first side portion 71.

In addition, the reflective sheet 60 and the first side portion 71 may face the diffuser plate 31. In other words, the reflective sheet 60 and the first side portion 71 may overlap the diffuser plate 31, the optical sheet 32, and the display panel 10 in the front-rear direction. In this case, the light from the light source 51 (see FIG. 19) may be spread by the lens 53, may be reflected by the reflective sheet 60 and the first side portion 71, and may be provided to the diffuser plate 31, the optical sheet 32, and the display panel 10. Accordingly, the first side portion 71 may secure a sufficient amount of light in a portion relatively far from the lens 53.

In addition, the first side portion 71 may include a first seating portion 711 and a first locking portion 712. The first seating portion 711 may be angled upward from the front end of the first side portion 71, and may be located between the first horizontal portion 21H and the first support portion 813a. The first seating portion 711 may be disposed in parallel with the first support portion 813a and may be seated inside the first support portion 813a. In this case, a portion of the diffuser plate 31 may be in contact with the front side of the first seating portion 711. In addition, a first protrusion 21Ha may protrude from the first horizontal portion 21H toward the first seating portion 711 and may be in contact with the front side of the first seating portion 711. That is, a part of the diffuser plate 31 and the first protrusion 21Ha may press the first seating portion 711 toward the first support portion 813a. The first locking portion 712 may be angled downward from the rear end of the first side portion 71, and may be located between the heat sink 83 and the press portion 811. For example, the first locking portion 712 may be spaced apart from the press portion 811 in the forward direction. The first locking portion 712 may be disposed in parallel with the heat sink 83 and may be in contact with the rear side of the heat sink 83. That is, the first locking portion 712 may be caught on the rear side of the heat sink 83. Accordingly, the first side portion 71 may be fixed to the heat sink 83 and the frame 80. As an example, the width of the first seating portion 711 and the width of the first locking portion 712 may be smaller than the width Wb1 of the first side portion 71.

Referring back to FIGS. 6 and 24, the frame 80 may include a press portion 811, a bending portion 812, and a second support portion 813b. The press portion 811 may be formed while being pressed from the front to the rear of the frame 80. The press portion 811 may be spaced rearward from the heat sink 83. The bending portion 812 may be angled from the press portion 811 toward the display panel 10. The angle between the bending portion 812 and the press portion 811 may be an obtuse angle. The second support portion 813b may be angled from the bending portion 812 toward the second part 22. The second support portion 813b may be disposed in parallel to the second horizontal portion 22H at the rear of the second horizontal portion 22H. In some embodiments, the above mentioned lower end 80bb of frame 80 may protrude rearward from the second support portion 813b.

The second side portion 72 may extend along the lower side of the heat sink 83, and may be disposed to be inclined toward the display panel 10 with respect to the heat sink 83. The second side portion 82 may form an obtuse angle with respect to the heat sink 83. In other words, the length of the second side portion 72 may be defined in the left-right direction, the width Wb2 of the second side portion 72 may be defined in a direction forming an obtuse angle with respect to the heat sink 83, and the thickness of the second side portion 72 may be defined in a direction orthogonal to the length direction and the width direction of the second side portion 72.

In addition, the reflective sheet 60 and the second side portion 72 may face the diffuser plate 31. In other words, the reflective sheet 60 and the second side portion 72 may be overlapped with the diffuser plate 31, the optical sheet 32, and the display panel 10 in the front-rear direction. In this case, the light from the light source 51 (see FIG. 19) may be diffused by the lens 53, may be reflected by the reflective sheet 60 and the second side portion 72, and may be provided to the diffuser plate 31, the optical sheet 32, and the display panel 10. Accordingly, the second side portion 72 may secure a sufficient amount of light from a portion relatively far from the lens 53.

In addition, the second side portion 72 may include a second seating portion 721 and a second locking portion 722. The second seating portion 721 may be angled downward from the front end of the second side portion 72, and may be located between the second horizontal portion 22H and the second support portion 813b. The second seating portion 721 may be disposed in parallel with the second support portion 813b and may be seated inside the second support portion 813b. In this case, a part of the diffuser plate 31 may be in contact with the front side of the second seating portion 721. In addition, the second protrusion (not shown) may protrude from the second horizontal portion 22H toward the second seating portion 721, and may be in contact with the front side of the second seating portion 721. That is, the part of the diffuser plate 31 and the second protrusion may press the second seating portion 721 toward the second support portion 813b. The second locking portion 722 may be angled upward from the rear end of the second side portion 72, and may be located between the heat sink 83 and the press portion 811. For example, the second locking portion 722 may be spaced apart from the press portion 811 in the front direction. The second locking portion 722 may be disposed in parallel with the heat sink 83 and may be in contact with the rear side of the heat sink 83. That is, the second locking portion 722 may be caught on the rear side of the heat sink 83. Accordingly, the second side portion 72 may be fixed to the heat sink 83 and the frame 80. As an example, the width of the second seating portion 721 and the width of the second locking portion 722 may be smaller than the width Wb2 of the second side portion 72.

Referring back to FIGS. 7 and 24, the frame 80 may include a press portion 811, a bending portion 812, and a third support portion 813c. The press portion 811 may be formed while being pressed from the front side to the rear of the frame 80. The press portion 811 may be spaced rearward from the heat sink 83. The bending portion 812 may be angled from the press portion 811 toward the display panel 10. The angle between the bending portion 812 and the press portion 811 may be an obtuse angle. The third support portion 813c may be angled from the bending portion 812 toward the third part 23. The third support portion 813c may be disposed in parallel to the third horizontal portion 23H at the rear of the third horizontal portion 23H. In some embodiment, the left end 80cc of the above-mentioned frame 80 may protrude from the third support portion 813c toward the third groove 23g. In addition, the light shield pad LP may face the left end 80cc of the third support portion 813c and may be coupled to the inner side of the third vertical portion 23V.

The third side portion 73 may extend along the left side of the heat sink 83, and may be disposed to be inclined toward the display panel 10 with respect to the heat sink 83. The third side portion 73 may form an obtuse angle with respect to the heat sink 83. In other words, the length of the third side portion 73 may be defined in the vertical direction, the width Wb3 of the third side portion 73 may be defined in a direction forming an obtuse angle with respect to the heat sink 83, and the thickness of the third side portion 73 may be defined in a direction orthogonal to the length direction and the width direction of the third side portion 73.

In addition, the reflective sheet 60 and the third side portion 73 may face the diffuser plate 31. In other words, the reflective sheet 60 and the third side portion 73 may overlap the diffuser plate 31, the optical sheet 32, and the display panel 10 in the front-rear direction. In this case, the light from the light source 51 (see FIG. 19) may be diffused by the lens 53, may be reflected by the reflective sheet 60 and the third side portion 73, and may be provided to the diffuser plate 31, the optical sheet 32, and the display panel 10.

Accordingly, the third side portion 73 may secure a sufficient amount of light in a portion relatively far from the lens 53.

In addition, the third side portion 73 may include a third seating portion 731 and a third locking portion 732. The third seating portion 731 may be angled to the left at the front end of the third side portion 73, and may be located between the third horizontal portion 23H and the third support portion 813c. The third seating portion 731 may be disposed in parallel with the third support portion 813c and may be seated inside the third support portion 813c. In this case, a part of the diffuser plate 31 may be in contact with the front side of the third seating portion 731. In addition, a third protrusion (not shown) may protrude from the third horizontal portion 23H toward the third seating portion 731, and may be in contact with the front side of the third seating portion 731. That is, a part of the diffuser plate 31 and the third protrusion may press the third seating portion 731 toward the third support portion 813c. The third locking portion 732 may be angled to the right at the rear end of the third side portion 73, and may be located between the heat sink 83 and the press portion 811. For example, the third locking portion 732 may be spaced apart from the press portion 811 in the front direction. The third locking portion 732 may be disposed in parallel with the heat sink 83 and may be in contact with the rear side of the heat sink 83. That is, the third locking portion 732 may be caught on the rear side of the heat sink 83. Accordingly, the third side portion 73 may be fixed to the heat sink 83 and the frame 80. As an example, the width of the third seating portion 731 and the width of the third locking portion 732 may be smaller than the width Wb3 of the third side portion 73.

Referring back to FIGS. 8 and 24, the frame 80 may include a press portion 811, a bending portion 812, and a fourth support portion 813d. The press portion 811 may be formed while being pressed from the front side to the rear of the frame 80. The press portion 811 may be spaced rearward from the heat sink 83. The bending portion 812 may be angled from the press portion 811 toward the display panel 10. The angle between the bending portion 812 and the press portion 811 may be an obtuse angle. The fourth support portion 813d may be angled from the bending portion 812 toward the fourth part 24. The fourth support portion 813d may be disposed in parallel to the fourth horizontal portion 24H at the rear side of the fourth horizontal portion 24H. Meanwhile, the above-mentioned right end 80dd of frame 80 may protrude from the fourth support 813d toward the fourth groove 24g. In addition, the light shield pad LP may face the right end 80dd with respect to the fourth support portion 813d and may be coupled to the inner side of the fourth vertical portion 24V.

The fourth side portion 74 may extend along the right side of the heat sink 83, and may be disposed to be inclined toward the display panel 10 with respect to the heat sink 83. The fourth side portion 74 may form an obtuse angle with respect to the heat sink 83. In other words, the length of the fourth side portion 74 may be defined in the vertical direction, the width Wb4 of the fourth side portion 74 may be defined in a direction forming an obtuse angle with respect to the heat sink 83, and the thickness of the fourth side portion 73 may be defined in a direction orthogonal to the length direction and the width direction of the fourth side portion 73.

In addition, the reflective sheet 60 and the fourth side portion 74 may face the diffuser plate 31. In other words, the reflective sheet 60 and the fourth side portion 74 may overlap the diffuser plate 31, the optical sheet 32, and the display panel 10 in the front-rear direction. In this case, the light from the light source 51 (see FIG. 19) may be spread by the lens 53, may be reflected by the reflective sheet 60 and the fourth side portion 74, and may be provided to the diffuser plate 31, the optical sheet 32, and the display panel 10. Accordingly, the fourth side portion 74 can secure a sufficient amount of light in a portion relatively far from the lens 53.

In addition, the fourth side portion 74 may include a fourth seating portion 741 and a fourth locking portion 742. The fourth seating portion 741 may be angled to the right at the front end of the fourth side portion 74, and may be located between the fourth horizontal portion 24H and the fourth support portion 813d. The fourth seating portion 741 may be disposed in parallel with the fourth support portion 813d, and may be seated inside the fourth support portion 813d. In this case, a part of the diffuser plate 31 may be in contact with the front side of the fourth seating portion 741. In addition, a fourth protrusion (not shown) may protrude from the fourth horizontal portion 24H toward the fourth seating portion 741, and may be in contact with the front side of the fourth seating portion 741. That is, a part of the diffuser plate 31 and the fourth protrusion may press the fourth seating portion 741 toward the fourth support portion 813d. The fourth locking portion 742 may be angled to the left at the rear end of the fourth side portion 74, and may be located between the heat sink 83 and the press portion 811. For example, the fourth locking portion 742 may be spaced apart from the press portion 811 in the forward direction. The fourth locking portion 742 may be disposed in parallel with the heat sink 83 and may be in contact with the rear side of the heat sink 83. That is, the fourth locking portion 742 may be caught on the rear side of the heat sink 83. Accordingly, the fourth side portion 74 may be fixed to the heat sink 83 and the frame 80. For example, the width of the fourth seating portion 741 and the width of the fourth locking portion 742 may be smaller than the width Wb4 of the fourth side portion 73.

Referring to FIGS. 1 to 25, according to an aspect of the present disclosure, a display panel; a frame located at a rear side of the display panel; a substrate located between the display panel and the frame, wherein the substrate is coupled to the frame and extends in a longitudinal direction; a plurality of light sources mounted on the substrate, wherein each of the plurality of light sources are spaced apart from each other in the longitudinal direction of the substrate; a plurality of lenses coupled to the substrate, wherein the plurality of lenses cover the plurality of light sources; and a bar coupled to the substrate, wherein the bar connects each of the plurality of lenses.

According to another aspect of the present disclosure, the display device may further include a reflective sheet located on the substrate and the bar, wherein the reflective sheet comprises a plurality of lens holes configured to allow the plurality of lenses to pass therethrough.

According to another aspect of the present disclosure, the bar may have a rounded surface such that the reflective sheet is in close contact with the rounded surface of the bar.

According to another aspect of the present disclosure, each of the plurality of lenses is spaced apart from a portion forming the plurality of lens holes of the reflective sheet by a gap.

According to another aspect of the present disclosure, a sum of a thickness of the bar and a thickness of the reflective sheet is less than a half of a height of the plurality of lenses with respect to the substrate.

According to another aspect of the present disclosure, a sum of a thickness of the bar and a thickness of the reflective sheet is less than a third of a height of the plurality of lenses with respect to the substrate.

According to another aspect of the present disclosure, the plurality of lenses is connected to the bar by at least two lenses from the plurality of lenses.

According to another aspect of the present disclosure, the bar is extended and arranged with the plurality of lenses in the longitudinal direction of the substrate.

According to another aspect of the present disclosure, the bar further comprises: a body spaced apart from one side of the plurality of lenses and extends in the longitudinal direction of the substrate; and legs extended from the body in a direction perpendicular to a longitudinal direction of the body and connected to the plurality of lenses.

According to another aspect of the present disclosure, the bar may further include: an upper bar connected to an upper side of the plurality of lenses; and a lower bar connected to a lower side of the plurality of lenses, wherein each of the upper bar and the lower bar has the body and the legs.

According to another aspect of the present disclosure, each of the plurality of lenses are spaced apart from each other in a direction perpendicular to the longitudinal direction of the substrate and disposed at the substrate to form a row and a column of light sources, wherein the bar comprises a plurality of bars that are spaced apart from each other in a direction of the column.

According to another aspect of the present disclosure, the plurality of bars is disposed at the substrate to overlap with each other in the direction of the column or are alternately disposed at the substrate.

According to another aspect of the present disclosure, the substrate may include: a first plate; and a plurality of second plates extended from the first plate in the longitudinal direction of the substrate and spaced apart from each other in a direction perpendicular to the longitudinal direction of the substrate, wherein the bar comprises a plurality of bars located on the first plate and the plurality of second plates and spaced apart from each other in the longitudinal direction of the substrate.

According to another aspect of the present disclosure, the reflective sheet covers the first plate, the plurality of second plates, and spaces between the plurality of second plates.

According to another aspect of the present disclosure, the substrate further comprises a plurality of substrates adjacent to each other and spaced apart from each other, wherein the reflective sheet comprises a plurality of reflective sheets coupled to the plurality of substrates, and the display device further comprises a side portion extended along a circumference of the plurality of reflective sheets and disposed to be inclined toward the display panel with respect to the plurality of reflective sheets, wherein the side portion comprises a reflective material.

The effect of the display device according to the present disclosure will be described as follows.

According to at least one of the embodiments of the present disclosure, it is possible to provide a display device capable of reducing manufacturing cost or process cost of a substrate.

According to at least one of the embodiments of the present disclosure, it is possible to provide a display device capable of securing a sufficient amount of light in a wide range in relation to the number and position of light sources.

According to at least one of the embodiments of the present disclosure, it is possible to provide a display device capable of improving the productivity of lenses fixed on a substrate.

According to at least one of the embodiments of the present disclosure, it is possible to provide a display device capable of improving the adhesion of the lens and the reflective sheet with respect to the substrate.

According to at least one of the embodiments of the present disclosure, it is possible to provide various examples of the shape of a bar connecting a plurality of lenses.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel;
    a frame located at a rear side of the display panel;
    a substrate located between the display panel and the frame, wherein the substrate is coupled to the frame and extends in a longitudinal direction;
    a plurality of light sources mounted on the substrate, wherein the plurality of light sources are spaced apart from each other in the longitudinal direction of the substrate;
    a plurality of lenses coupled to the substrate, wherein the plurality of lenses cover the plurality of light sources; and
    a bar coupled to the substrate, wherein the bar connects each of the plurality of lenses; and
    a reflective sheet located on the substrate and the bar, wherein the reflective sheet comprises a plurality of lens holes configured to allow the plurality of lenses to pass therethrough,
    wherein the bar has a rounded surface such that the reflective sheet is in close contact with the rounded surface of the bar.

2. The display device of claim 1, wherein each of the plurality of lenses is spaced apart from a portion forming the plurality of lens holes of the reflective sheet by a gap.

3. The display device of claim 2, wherein a sum of a thickness of the bar and a thickness of the reflective sheet is less than a half of a height of the plurality of lenses with respect to the substrate.

4. The display device of claim 2, wherein a sum of a thickness of the bar and a thickness of the reflective sheet is less than a third of a height of the plurality of lenses with respect to the substrate.

5. The display device of claim 1, wherein the plurality of lenses is connected to the bar by at least two lenses from the plurality of lenses.

6. The display device of claim 5, wherein the bar is extended and arranged with the plurality of lenses in the longitudinal direction of the substrate.

7. The display device of claim 5, wherein the bar comprises:
a body spaced apart from one side of the plurality of lenses and extending in the longitudinal direction of the substrate; and
legs extending from the body in a direction perpendicular to a longitudinal direction of the body and connected to the plurality of lenses.

8. The display device of claim 7, wherein the body comprises:
an upper body apart from an upper side of the plurality of lenses and extending in the longitudinal direction of the substrate; and
a lower body apart from a lower side of the plurality of lenses and extending in the longitudinal direction,
wherein the legs comprise:
upper legs extending from the upper body in a direction perpendicular to a longitudinal direction of the upper body and connected to the plurality of lenses; and
lower legs extending from the lower body in a direction perpendicular to a longitudinal direction of the lower body and connected to the plurality of lenses.

9. The display device of claim 5, wherein the plurality of lenses are disposed at the substrate in rows and columns, wherein the bar is one of a plurality of bars spaced apart from each other in a direction of a column of the columns.

10. The display device of claim 9, wherein the plurality of bars are aligned with each other or are arranged in a staggered fashion in the direction of the column.

11. The display device of claim 1, wherein the substrate comprises:
a first plate; and
a plurality of second plates extended from the first plate in the longitudinal direction of the substrate and spaced apart from each other in a direction perpendicular to the longitudinal direction of the substrate,
wherein the bar is one of a plurality of bars located on the first plate and the plurality of second plates and spaced apart from each other in the longitudinal direction of the substrate.

12. The display device of claim 11, wherein the reflective sheet covers the first plate, the plurality of second plates, and spaces between the plurality of second plates.

13. The display device of claim 11, wherein the substrate is one of a plurality of substrates adjacent to each other and spaced apart from each other,
wherein the reflective sheet is one of a plurality of reflective sheets coupled to the plurality of substrates, and
the display device further comprises a side portion extended along a circumference of the plurality of reflective sheets and disposed to be inclined toward the display panel with respect to the plurality of reflective sheets,
wherein the side portion comprises a reflective material.

* * * * *